United States Patent [19]

Tsunekawa et al.

[11] 4,283,137
[45] Aug. 11, 1981

[54] IMAGE SCANNING SYSTEM

[75] Inventors: Tokuichi Tsunekawa, Yokohama; Makoto Masunaga, Tokyo; Kazuya Hosoe, Machida; Yukichi Niwa; Mitsutoshi Owada, both of Yokohama; Noriyuki Asano, Kawasaki, all of Japan

[73] Assignee: Canon Kabushiki Kaisha, Tokyo, Japan

[21] Appl. No.: 25,544

[22] Filed: Mar. 30, 1979

[30] Foreign Application Priority Data

Mar. 31, 1978 [JP] Japan .................................. 53/38566

[51] Int. Cl.³ .......................... G01C 3/08; G03B 7/08
[52] U.S. Cl. ........................................ 356/4; 250/201; 250/204; 354/25; 354/60 L; 356/1
[58] Field of Search ............... 356/4, 1; 250/201, 204; 354/25, 60 L; 358/213

[56] References Cited

U.S. PATENT DOCUMENTS

| | | | |
|---|---|---|---|
| 3,955,892 | 5/1976 | Numata et al. ..................... 354/60 L |
| 4,004,852 | 1/1977 | Pentecost ............................... 356/1 |
| 4,035,815 | 7/1977 | Takahashi ......................... 356/60 L |
| 4,078,171 | 3/1978 | Stauffer ................................ 250/201 |
| 4,112,440 | 9/1978 | Kanemaru .......................... 354/60 L |
| 4,135,815 | 1/1979 | Masunaga et al. .................. 250/201 |
| 4,173,772 | 11/1979 | White .................................. 358/213 |

Primary Examiner—Stephen C. Buczinski
Attorney, Agent, or Firm—Fitzpatrick, Cella, Harper & Scinto

[57] ABSTRACT

This specification discloses an image scanning system in which an object image formed by an optical system is electrically scanned by utilization of a photosensor array device and the image scanning output then obtained is quantized to thereby provide quantized image data. According to the improvement of the present invention, there are obtained two different quantized image data, namely, first quantized image data quantized by a voltage level determined on the basis of the image scanning output from the sensor device and second quantized image data quantized by a predetermined fixed voltage level.

28 Claims, 16 Drawing Figures

| FIG. 3A | FIG. 3B |

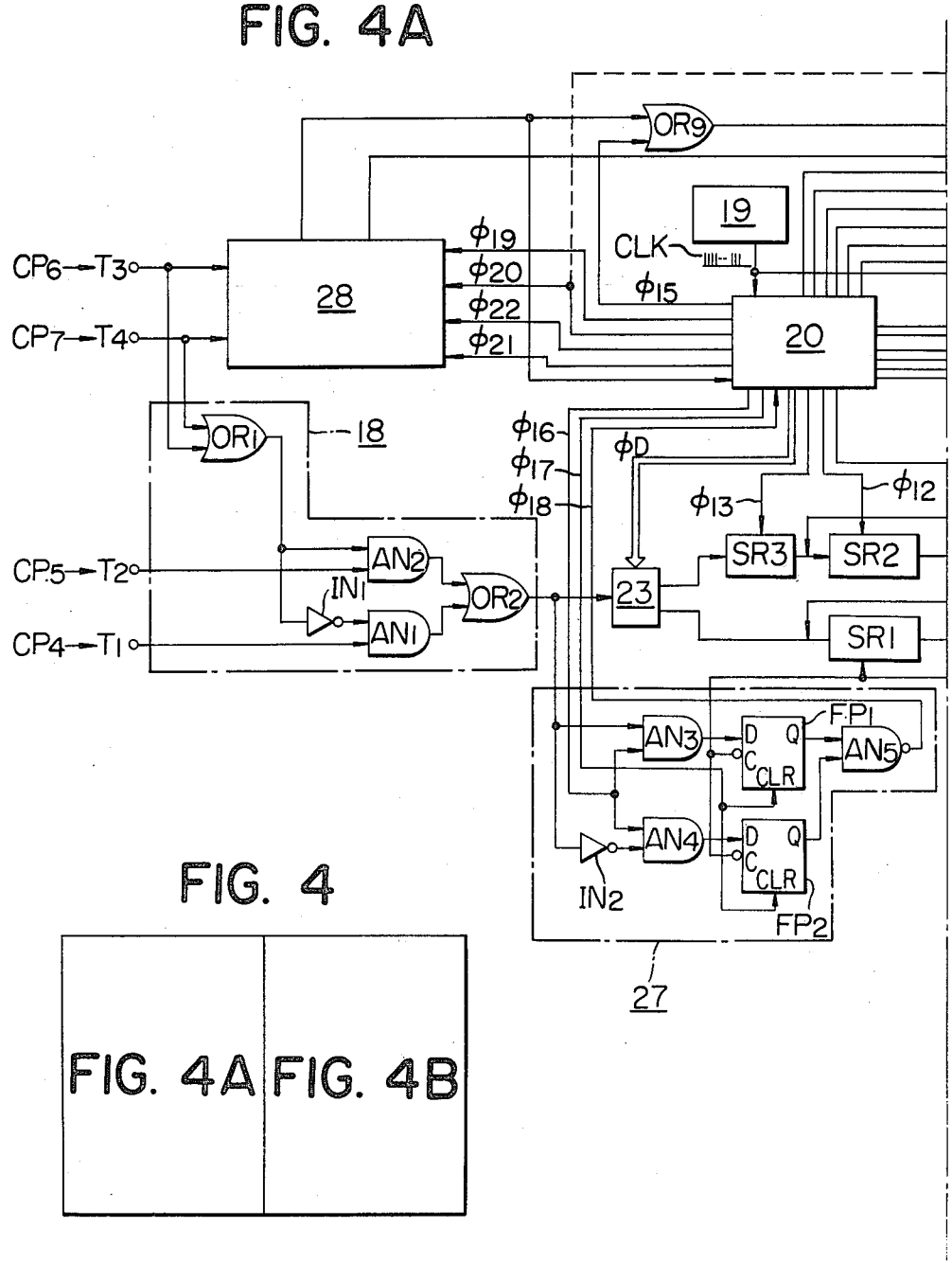

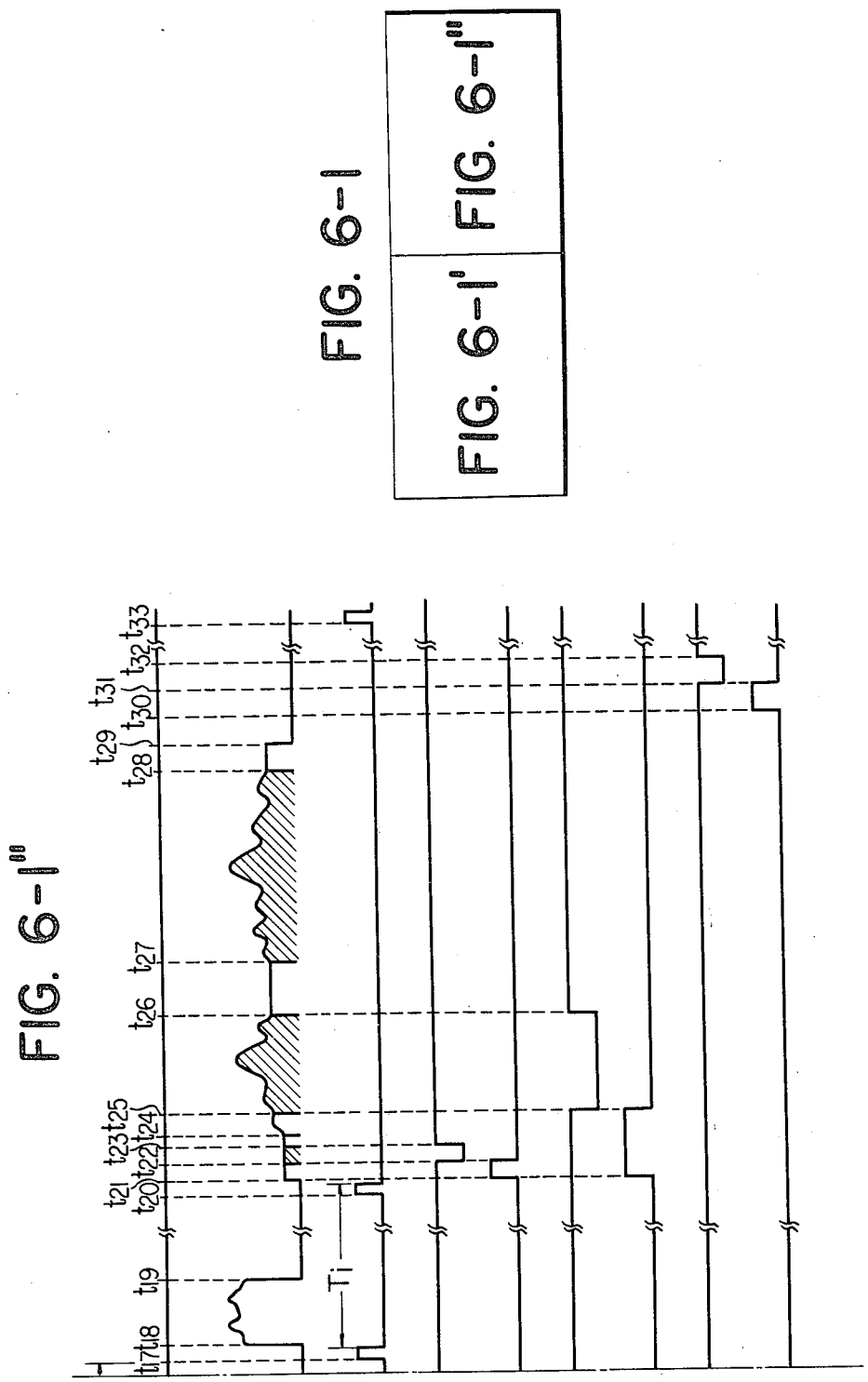

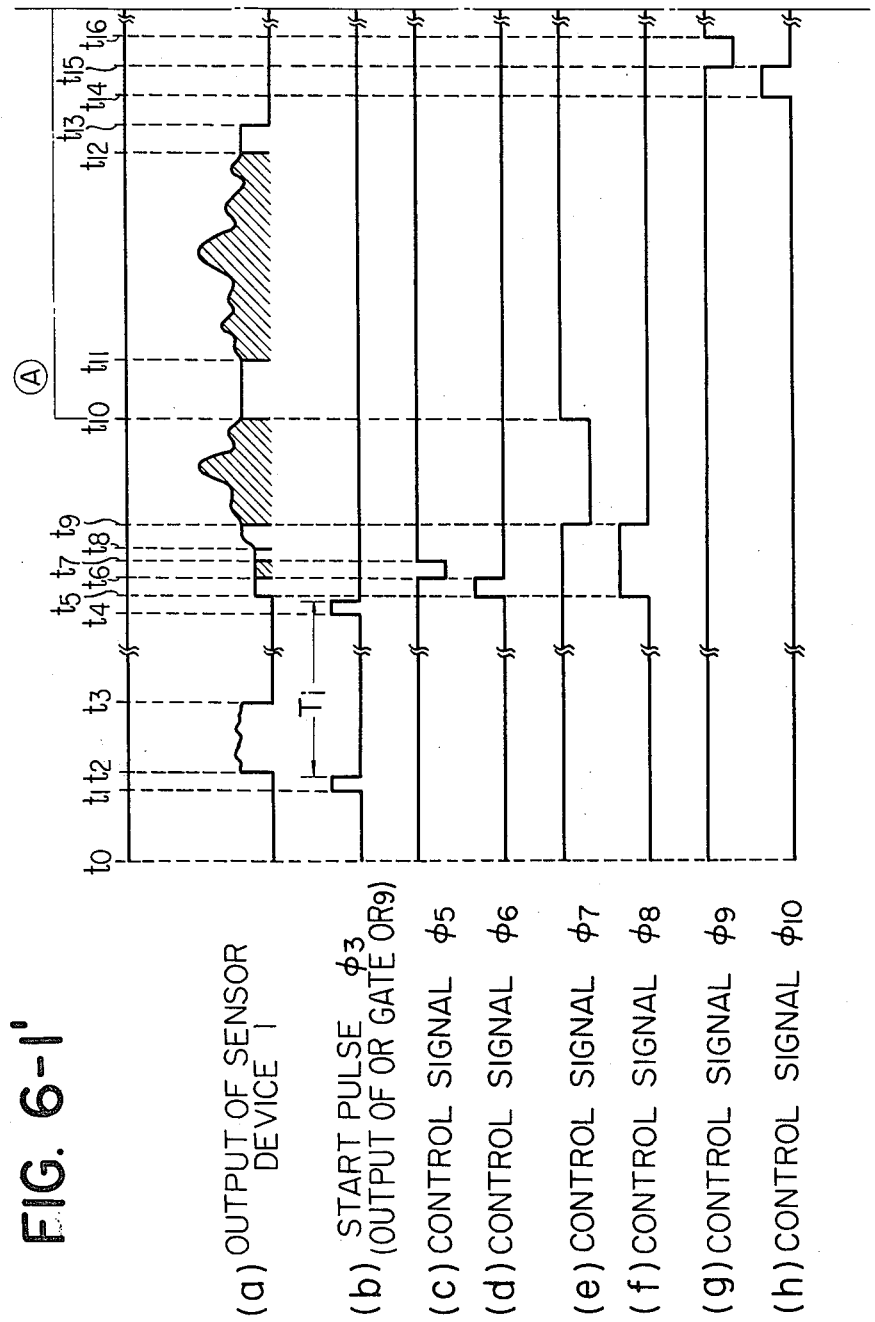

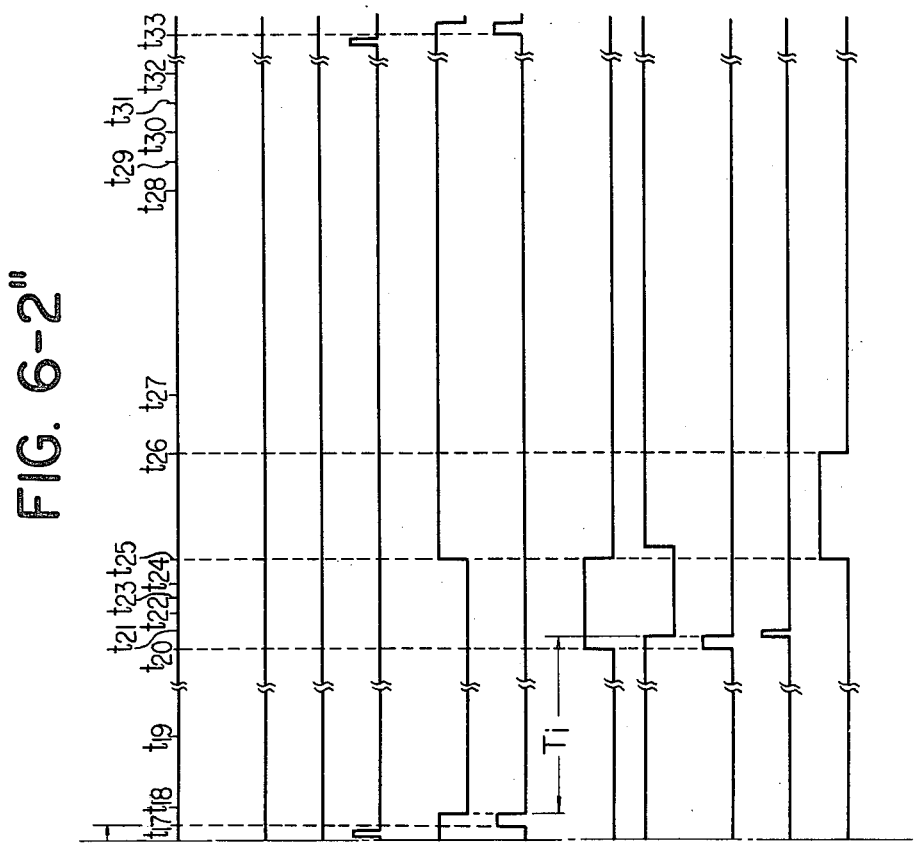

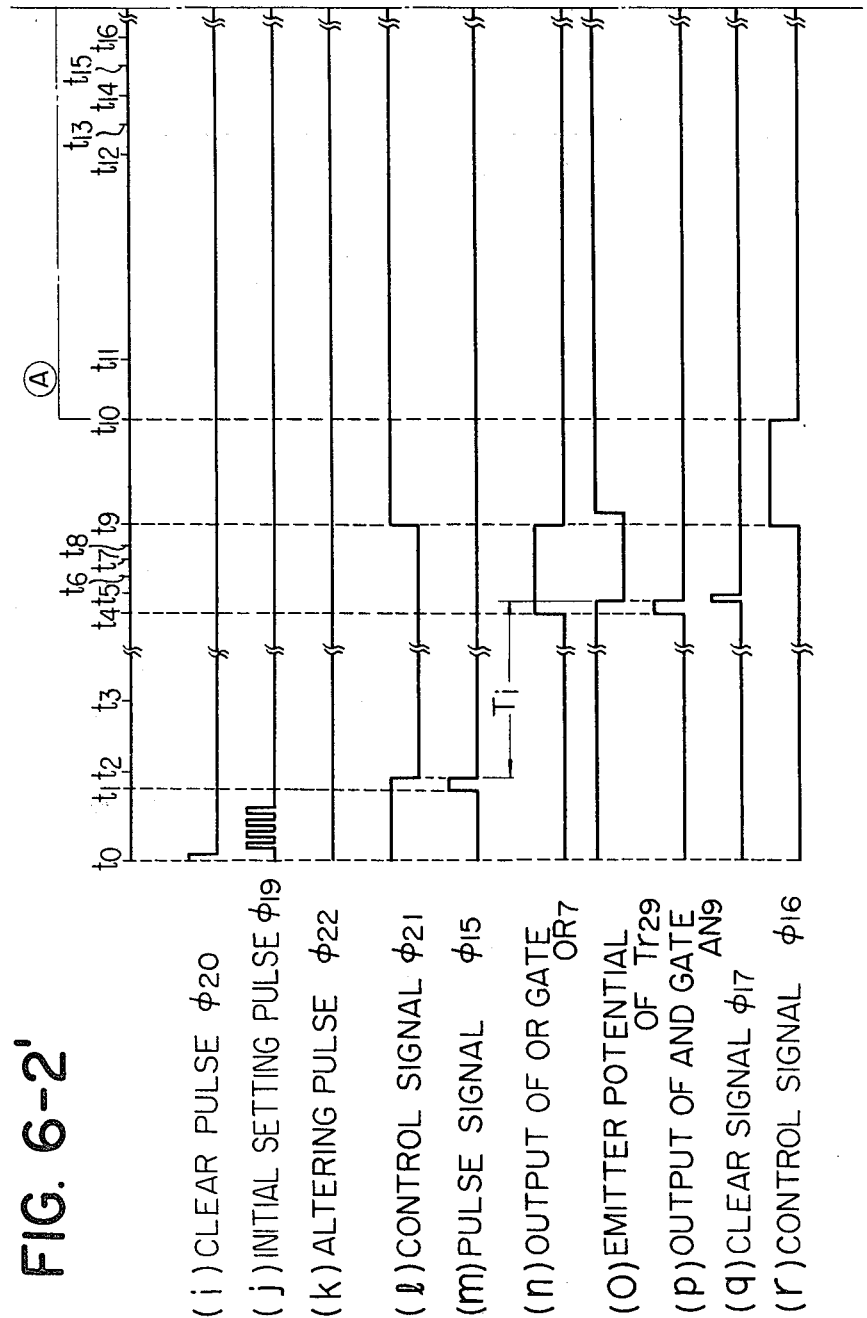

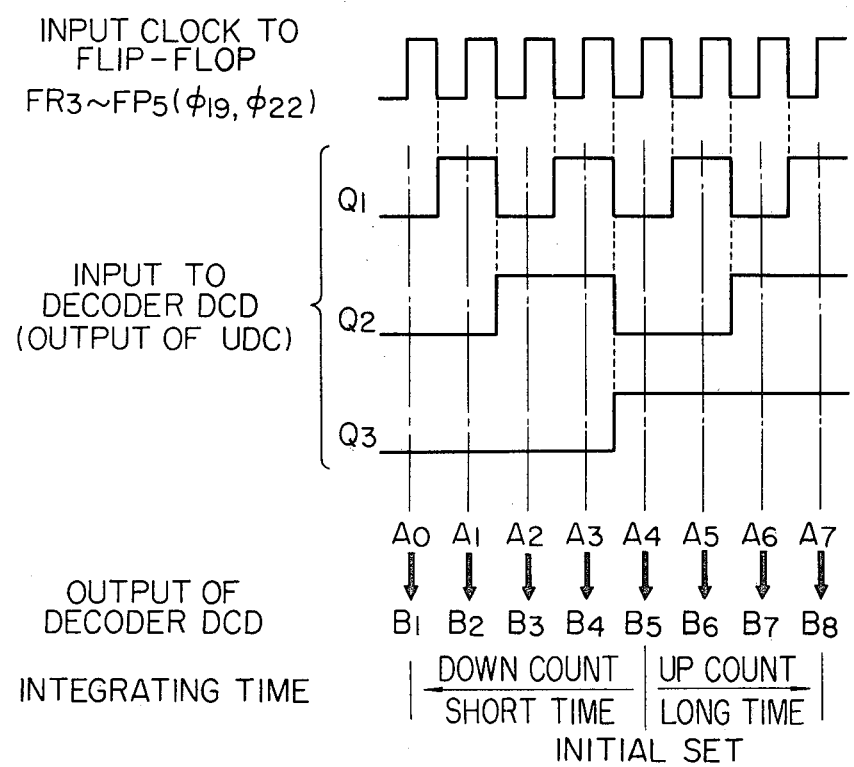

IMAGE SCANNING SYSTEM

BACKGROUND OF THE INVENTION

1. Field of the Invention

This invention relates to an image scanning system, and more particularly to an image scanning system in which an object image formed by an optical system is electrically scanned by the use of a photosensor array device and the image scanning output then obtained is quantized to provide quantized data on the object image.

2. Description of the Prior Art

Owing to the recent remarkable development of the semiconductor art, the so-called self-scanning type sensor array devices such as self-scanning type photo-diode arrays, CCD photosensors or CCD photo diode arrays comprising a combination of CCD and photodiodes have become commercially available at low cost and in such a trend of technological innovation, efforts have been made to utilize such type of photosensor array device as electrical image scanning means to automatically detect the distance to an object or the focus point of the optical system with respect to the object with the aid of the scanning output signal provided thereby.

For example, U.S. Pat. No. 4,004,852 proposes an electronic automatic range finding device wherein a standard field image and a reference field image containing the standard field image and being in a wider range than the standard field image are formed regarding a target object by a base line range finder type optical system and these standard and reference field images are electrically scanned by the use of a photosensor array device while, at the same time, the scanning output signals then obtained regarding the standard and reference field images are transformed into binary form (quantized) by a binary encoding circuit, whereafter the binary data are stored in shift registers so that the binary data on the standard field image stored in a shift register is compared with the binary data on the reference field image stored in a shift register, namely, the image correlation therebetween is taken, thereby detecting an image portion of the reference field image which can be regarded as being coincident with the standard field or which is most similar to the standard field and detecting the distance to the target object from the information on the alignment, namely, location, of the most similar image portion within the reference field image.

Now, where an object image is thus scanned by the use of a photosensor array device while, at the same time, the image scanning output signal then obtained is quantized to provide a quantized data on the object image and the distance to the object or the focus point of the optical system with respect to the object is to be detected on the basis of such quantized data, how to obtain quantized data exactly corresponding to the image pattern of the object is the fundamental requirement for fully ensuring the detection accuracy. That is, in such type of apparatus, no matter how high the performance of the data processing system may be, the detection accuracy thereof cannot be warranted unless the quantized image data as an input accurately represents the information on the image pattern of the object and accordingly, in such type of apparatus, the quality of the detection accuracy thereof is determined entirely by the quantization process of the image scanning output signal obtained. For example, the apparatus proposed in the aforementioned U.S. Pat. No. 4,004,852 adopts, as the method of quantization process of the image scanning output signal, a method which utilizes a saturation level of the sensor device output (this means, in case of a photosensor array device which is CCD photosensor or CCD photodiode array, an output level at which the stored charge in the photosensor portion is saturated) and a level of the sensor device output with no light impinging on the sensor device, namely, a dark level and uses $\frac{1}{2}$ of the difference between the saturation level and the dark level as the standard level for quantizing (binary-encoding) the image scanning output signal, namely, the slice level, and wherein the level over this slice level is a logic value "1" and the level below this slice level is a logic value "0". According to this, the slice level is always fixed while, on the other hand, the level of the image scanning output is variously variable in accordance with variations in brightness of the target object and therefore, it is utterly impossible to obtain accurate quantized data on the object image and in some cases, there are only obtained data which are all "1" or all "0" and in such cases, the detection of the distance is entirely impossible.

In contrast, for example, if the peak value of the image scanning output obtained during each cycle of image scanning is detected each time and a voltage level obtained by multiplying this peak value by a certain ratio (a certain constant smaller than 1) is used as the slice level and held until the next cycle of image scanning is terminated and the image scanning output obtained during this next cycle of image scanning is quantized with the said slice level obtained during the previous cycle of image scanning being as the standard, variation in the level of the image scanning output resulting from variation in brightness of the object accompanies variation in the peak value thereof as well as variation in the slice level, thus enabling accurate quantization of the image scanning output.

On the other hand, the level of the sensor device output should desirably be always in a predetermined level range to facilitate the subsequent processing and therefore, for variation in brightness of the object, it is the practice to suitably adjust the integration time of the image signal of the sensor device (in case of a CCD photosensor or a CCD photodiode array, the charge storage time in the photosensor portion), namely, to shorten this integration time when the object is bright and extend the integration time when the object is dark, thereby adjusting the level of the obtained sensor device output so that it is always within a predetermined level range irrespective of the variation in brightness of the object. The most rational and simplest method as the method of adjusting the integration time is to detect the level of the sensor device output and vary the timing for reading out the sensor device output on the basis of the result of the detection, but here the following inconvenience will occur when the integration time of the sensor device is suitably adjusted on the basis of the information on the brightness of the object while, on the other hand, as the method of quantizing the image scanning output, a slice level is determined on the basis of the peak value of the image scanning output and the quantization of the image scanning output obtained during the next cycle of image scanning is effected with the said slice level as the standard.

That is, for example, assuming that the integration time of the sensor device has been changed, the scanning output whose level has been properly adjusted so as to be within said predetermined level range by the change in the integration time is obtained in at least the next cycle, or in some cases, the next cycle (namely, the second cycle as counted from the point of time whereat the integration time was changed) of image scanning while, on the other hand, the slice level for the scanning output obtained with the integration time changed is determined on the basis of the peak value of the scanning output obtained during the previous cycle of image scanning. In other words, the scanning output before the integration time is changed, and accordingly, the scanning output before the level thereof is properly adjusted so as to be within said predetermined level range and therefore, in this case, the good scanning output obtained with the integration time changed is quantized by the slice level set on the basis of the peak value of the improper scanning output before the integration time is changed and thus, it is utterly impossible to obtain accurate quantized image data and after all, the image scanning of this cycle, namely, the cycle immediately succeeding to the change in the integration time becomes quite useless and this also leads to much loss of time. Also, this becomes a great problem where the change in the integration time is effected frequently. In addition, in the above-described method of quantization process, the aforementioned peak value is not yet obtained during the first cycle of image scanning and accordingly, the foregoing inconvenience also takes place with regard to the first cycle of image scanning.

SUMMARY OF THE INVENTION

The present invention has been made in view of the above-noted situations and a primary object thereof is to provide, as an image scanning system which electrically scans an object image by the utilization of a photosensor device and which quantizes the image scanning output then obtained, to thereby obtain quantized data on the object image, a more excellent and novel form of device which ensures acquisition of proper and effective quantized data.

It is another object of the present invention to eliminate all the above-noted inconveniences, as an image scanning system in which quantization of the image scanning output obtained during the next cycle of image scanning is effected by a voltage level determined on the basis of the image scanning output, as described above, and to effect quantization process without wasting the image scanning output even during the cycle of image scanning immediately succeeding the change in the integration time of the image signal for the sensor device, thereby ensuring acquisition of proper and effective quantized image data.

For such an object, according to the present invention, there is proposed, as such type of image scanning system, a more advantageous form of device in which two different quantized image data, namely, first quantized image data quantized by a voltage level determined on the basis of the image scanning output from the sensor array device and second quantized image data quantized by a predetermined fixed voltage level, may be obtained.

According to such form of device, in accordance with whether or not the integration time of the image signal for the photosensor array device has been changed, namely, when the change in the integration time has not been effected, the first quantized image data is selected and when the change in the integration time has been effected, the second quantized image data is selected, whereby proper and effective quantized image data may always be obtained irrespective of the presence or absence of the change in the integration time of the photosensor array device and accordingly, the above-noted inconveniences may all be eliminated.

Incidentally, more specific construction of the device will now be considered. According to a preferred embodiment of the present invention, there is proposed a construction of device which has first quantization means for providing the first quantized data, second quantization means for providing the second quantized data, select means for selecting the output data of said first and second quantization means, discrimination means for discriminating whether or not the integration time of the image signal of the sensor array device is proper, and integration time control means for controlling the integration time of the photosensor array device on the basis of the discrimination output from the discrimination means. The select means is responsive to the discrimination output from the discrimination means and selects the output data of the first quantization means when the integration time is proper, and selects the output data of the second quantization means when the integration time becomes inproper (in this case, a change in the integration time is effected by the integration time control means).

It is still another object of the present invention to provide, in the above-described construction of the device, particularly a more rational form for the quantization of the image scanning output by said first and second quantization means and for the discrimination of the properness or improperness of the integration time by the discrimination means.

For such object, according to a preferred embodiment of the present invention, there is proposed a construction which is provided with detection means for detecting the peak value of the image scanning output from the photosensor array device, quantization level determining means for determining the voltage level which provides the standard for quantizing the image scanning signal on the basis of the peak value detected by the detection means, and standard voltage setting means for setting a predetermined voltage range having an upper limit and a lower limit. The output of the quantization level determining means is imparted to the first quantization means as the standard level for quantization, and a specific voltage within said voltage range set by the standard voltage setting means is imparted to the second quantization means as the standard level for quantization, and said discrimination means discriminates whether the peak value detected by the detection means is within or deviated from said predetermined voltage range set by the standard voltage setting means, thereby discriminating whether or not the integration time of the photosensor array device is proper. Such construction is very rational as a form for the quantization of the image scanning output by the first and second quantization means and for the discrimination of the properness or improperness of the integration time by the discrimination means.

Other objects and features of the present invention will become apparent from the ensuing description taken in conjunction with the accompanying drawings.

BRIEF DESCRIPTION OF THE DRAWINGS

A preferred embodiment of the present invention will hereinafter be described by reference to the accompanying drawings, in which:

FIGS. 4, 4A and 4B are diagrams showing the construction of the circuit system subsequent to the circuit system of FIG. 3 which includes other important circuit portions in an embodiment of the present invention;

FIG. 6 is a time chart illustrating the waveform of the photosensor array device output resulting from the operation of the circuit systems of FIGS. 3 and 4 and the waveforms of signals generated in important circuit portions of the circuit systems;

FIG. 7 shows the states of the inputs and outputs of the up-down counter and decoder in the integration time control circuit of FIG. 5.

DESCRIPTION OF THE PREFERRED EMBODIMENTS

Figure 1:
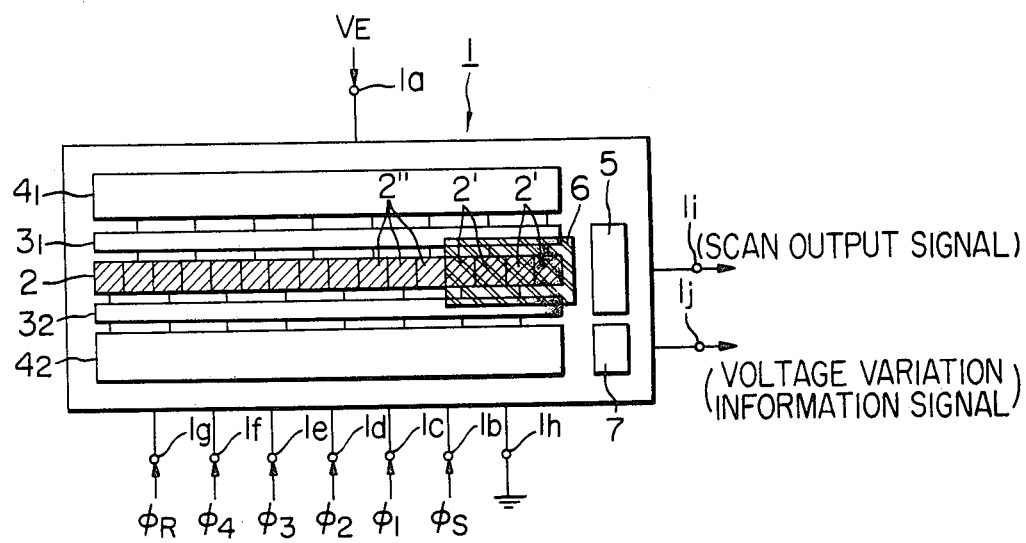
FIG. 1 schematically shows the construction of a photosensor array device applied to an embodiment of the image scanning system according to the present invention.

Referring first to FIG. 1, it schematically shows an example of the somewhat modified construction of a four-phase transfer self-scanning type CCD photosensor or CCD photodiode array as an example of the photosensor array device applicable to the device of the present invention. The photosensor array device is generally designated by 1 in the Figure.

Designated by 2 is a light receiving portion for converting a light signal into an electrical signal. The light receiving portion 2 has the function of generating an electrical charge corresponding to the incident light and storing the same therewithin. In the case of a CCD photodiode array, the light receiving portion 2 comprises a combination of photodiodes and CCD and still has a similar function.

Reference character $4_1$ designates a charge transfer portion for taking in the stored charges in the light receiving elements of, for example, odd number groups in the light receiving portion 2 through a transfer gate $3_1$ and successively transferring such charges to an output portion 5 in response to transfer clock, and reference character $4_2$ designates a charge transfer portion for taking in the stored charges in the light receiving elements of, for example, even number groups in the light receiving portion 2 through a transfer gate $3_2$ and successively transferring such charges to the output portion 5 in response to transfer clock. The output portion 5 has the function of converting into voltages or currents the stored charges in the light receiving elements successively transferred by the charge transfer portions $4_1$ and $4_2$ and putting out such voltages or currents.

Designated by 1a is a voltage input terminal. A voltage $V_E$ applied through the input terminal 1a, as is well-known, is imparted to the light receiving portion 2 as a photo-gate voltage (or such voltage provides a substrate bias voltage). Denoted by 1b is a start pulse input terminal. A start pulse $\phi_s$ applied through the input terminal 1b is imparted to the transfer gates $3_1$ and $3_2$ as a gate pulse. Designated by 1c, 1d, 1e and 1f are transfer clock input terminals through which four-phase transfer clocks $\phi_1$, $\phi_2$, $\phi_3$ and $\phi_4$ mutually having a deviation of $\frac{1}{4}$ period are applied. The four-phase transfer clocks $\phi_1$–$\phi_4$ applied through these input terminals 1c–1f are inparted to the charge transfer portions $4_1$ and $4_2$ for the taking-in and transfer of the charges. Reference character 1g designates a reset pulse input terminal. A reset pulse $\phi_R$ applied through the terminal 1g is imparted to a charge resulting MOS-FET in the output portion 5. Reference character 1h designates an earth or ground terminal, and reference character 1i denotes the output terminal of the sensor array device 1. The output terminal 1i is connected to the output portion 5.

What has been described above is the construction in the case of a CCD photosensor or CCD photodiode array, and incidentally, in the case of an ordinary self-scanning type photodiode array, as is well-known, the light receiving elements of the light receiving portion 2 are replaced by photodiodes and the transfer gate portions $3_1$ and $3_2$ are replaced by the switch train of the MOS-FET for addressing each photodiode and the charge transfer portions $4_1$ and $4_2$ are replaced by the switch addressing shift register and among the start pulse $\phi_s$ and the four-phase clocks $\phi_1$–$\phi_4$, only the clocks $\phi_1$ and $\phi_3$, for example, which are in inverted relationship with each other are imparted to the shift registers $4_1$ and $4_2$ and by the shift operation of the shift registers $4_1$ and $4_2$, each photodiode is addressed so that photoelectrically converted signal is put out from the output terminal 1i through each corresponding FET switch in the switch trains $3_1$, $3_2$ of the MOS-FET (that is, in this case, the output portion 5 becomes unnecessary). In the case of such self-scanning type photoarray, the voltage $V_E$ applied through the input terminal 1a is utilized as a charging voltage for the R-n capacitor of each photodiode.

Designated by 6 is a light intercepting layer formed as by Al evaporation to shield a part of the light receiving portion 2 from light so as to enable information regarding the dark current in the light receiving portion 2 to be obtained. The signal from the light receiving element covered with the light intercepting layer 6 is utilized as the dark current information signal for eliminating the dark current component in the image scanning output. The light intercepting layer 6 may be formed together with a well-known light interception layer for shielding the other portion than the light receiving portion 2 from light. As the light receiving element 2' to be covered with the light intercepting layer 6, it is advisable, for example, in the case of a CCD photosensor or CCD photodiode array, to select the light receiving elements positioned at or near the output portion 5, or in other words, the light receiving element positioned so that the stored charge therein reaches the output portion 5 at the initial stage of the charge transfer by the charge transfer portions $4_1$ and $4_2$, and in the case of a self-scanning type photodiode array, to select the photodiode or photodiodes addressed at the initial stage of the shift operation of the shift registers $4_1$ and $4_2$, and the number of elements so selected may preferably be plural.

Designated by 7 is a voltage variation detecting portion for detecting any voltage variation which the sensor device for the variation in the voltage $V_E$ applied through the input terminal $1a$ and putting out the variation information as an electrical signal. Details thereof are as shown in the equivalent circuit diagram of FIG. 2. In the Figure, reference characters $7a$ and $7b$ denote voltage dividing resistors for dividing the voltage $V_E$, and the resistors $7a$ and $7b$ are electrically connected to the input terminal $1a$ and the earth terminal $1h$, respectively, through a semiconductor channel. Denoted by $7d$ is a MOS-FET having its gate electrically connected to the voltage dividing point between the voltage dividing resistors $7a$ and $7b$ through a semiconductor channel, its drain electrically connected to the input terminal $1a$ through a semiconductor channel, and its source electrically connected to the earth terminal $1h$ through a resistor $7c$. With such a construction, a voltage within the sensor device corresponding to the voltage $V_E$ is produced at the junction between the source of FET $7d$ and the resistor $7c$ and accordingly, when a variation occurs to the voltage $V_E$, here is obtained an electrical signal regarding the resultant voltage variation within the sensor device. Designated by $I_j$ is an output terminal for the voltage variation information signal which is connected to the junction between the source of the FET $7d$ and the resistor $7c$.

Figure 3B:
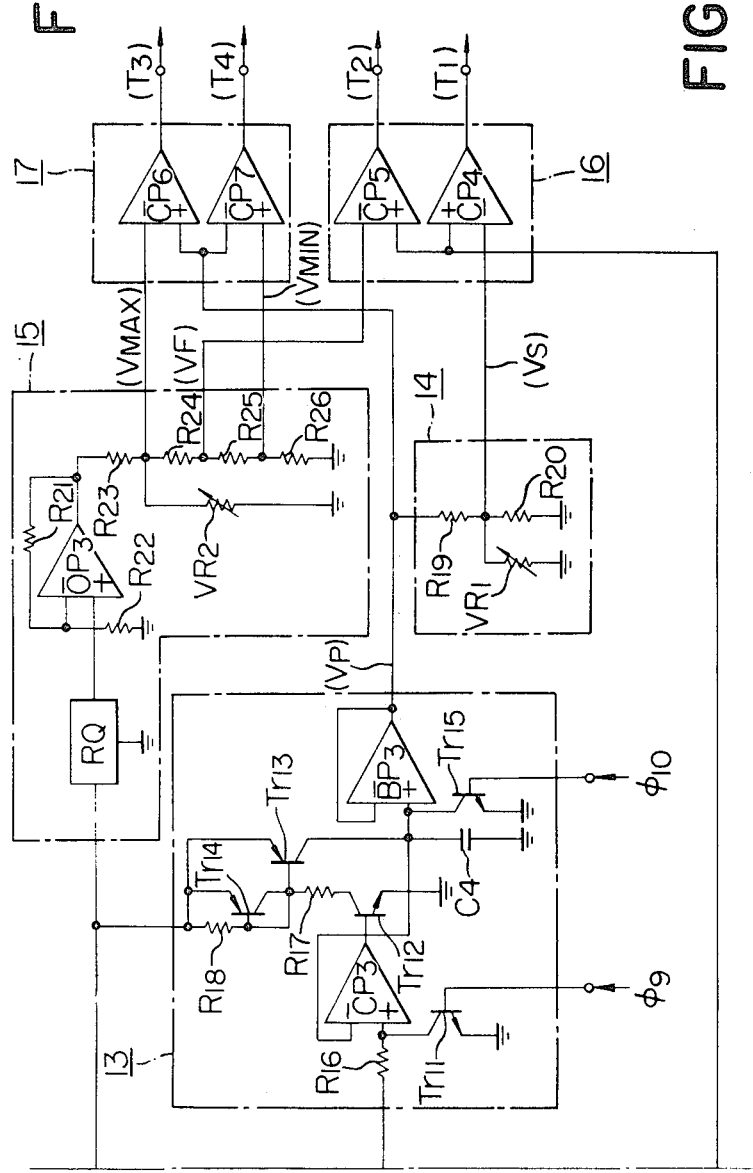
FIGS. 3A and 3B are circuit diagrams showing the construction of essential portions of the circuit system in an embodiment of the device according to the present invention to which the photosensor array device of FIG. 1 is applied.
Figure 3:
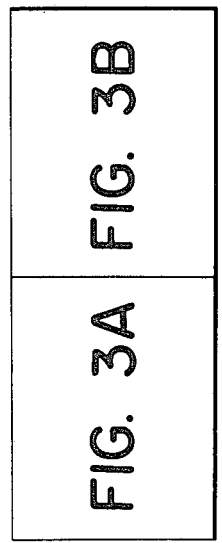
FIG. 3 shows the relation of combination between FIGS. 3A and 3B.
Figure 3A:
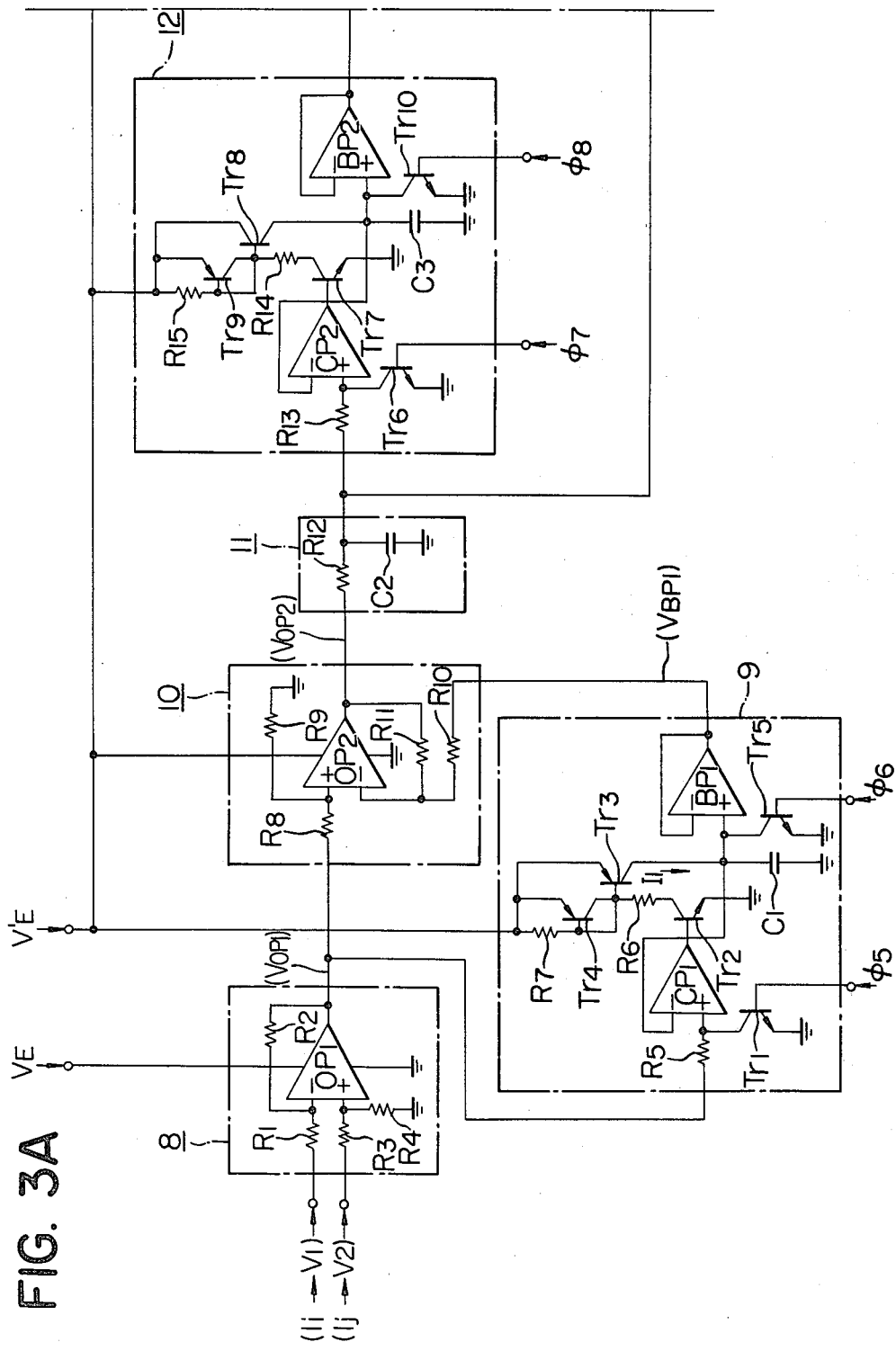

Reference is now had to FIGS. 3A and 3B to describe an example of the circuit in the device of the present invention to which the photosensor array device constructed as shown in FIG. 1 is applied.

First, the construction thereof will be described. Designated by 8 is a differential amplifier circuit as a voltage variation component eliminating circuit to which are applied both the output signal from the output terminal $1i$ of the sensor device 1 (shown in FIG. 6(a) and hereinafter referred to as the sensor output signal) and the output signal from the output terminal $1j$, namely, the voltage variation information signal from the voltage variation detecting portion 7 to eliminate the voltage variation component in the sensor output signal. The differential amplifier circuit 8 comprises an operational amplifier $OP_1$ and resistors $R_1$-$R_4$. The sensor signal from the output terminal $1i$ is applied to the inverting input terminal of the operational amplifier $OP_1$ through the resistor $R_1$ and the voltage variation information signal from the output terminal $1j$ is applied to the non-inverting input terminal of the operational amplifier $OP_1$ through the resistor $R_3$.

Denoted by 9 is a dark current signal detection and hold circuit to which is applied the output signal from the differential amplifier circuit 8, namely, the sensor output signal from which the voltage variation component has been eliminated, to detect and hold as a dark current signal the signal corresponding to the output signal from the light receiving element $2'$ shielded from light in the light receiving portion 2 of the sensor device 1. The dark current signal detection and hold circuit 9 comprises a comparator $CP_1$, resistors $R_5$-$R_7$, transistor $Tr_1$-$Tr_5$, a capacitor $C_1$ and a buffer amplifier $BP_1$. The output signal from the differential amplifier circuit 8 is applied to the non-inverting input terminal of the comparator $CP_1$ through the resistor $R_5$ only when the input control transistor $Tr_1$ is in non-conductive state. During that time, the hold voltage of the capacitor $C_1$ is applied to the inverting input terminal of the comparator $CP_1$ and the output of the comparator $CP_1$ is applied to the base of the transistor $Tr_2$ to define the charge amount of the capacitor $C_1$ in accordance with the level of the input signal to the non-inverting input terminal and thus, the capacitor $C_1$ is charged with a constant current for a time determined by the output of the comparator $CP_1$, in other words, a time corresponding to the level of the input signal applied to the non-inverting input terminal of the comparator $CP_1$, and after all, this circuit is operated by a constant current. The input to the non-inverting input terminal of the comparator $CP_1$ is controlled so that it becomes only part of the signal corresponding to the output signal from the light-shielded light receiving element, of the output signal from the differential amplifier circuit 8, as already noted, by a control signal $\phi_5$ (see FIG. 6(c)) being applied to the base of the input control transistor $Tr_1$. Also, the stored value of the capacitor $C_1$ is cleared by a control signal $\phi_6$ see FIG. 6(d)) being applied to the base of the stored value clear transistor $Tr$ before the output from the differential amplifier circuit 8 begins to be applied to the non-inverting input terminal of the comparator $CP_1$.

Designated by 10 is a differential amplifier circuit as a dark current component eliminating circuit to which are applied both the output signal from the differential amplifier circuit 8, namely, the sensor output signal from which the voltage variation component has been eliminated, and the output signal from the dark current signal detection and hold circuit 9, namely, the dark current information signal held by the capacitor $C_1$, to further eliminate the dark current component from the sensor output signal from which the voltage variation component has been eliminated. The differential amplifier circuit 10 comprises an operational amplifier $OP_2$ and resistors $R_8$-$R_{11}$, and the output signal from the differential amplifier circuit 8 is applied to the non-inverting input terminal of the operational amplifier $OP_2$ through the resistor $R_8$ and the output signal from the dark current signal detection and hold circuit is applied to the inverting input terminal of the operational amplifier $OP_2$ through the resistor $R_{10}$.

Reference character 10 denotes a filter circuit for further eliminating a high frequency noise component from the output signal from the differential amplifier circuit 10, namely, the sensor output signal from which the voltage variation component and the dark current component have been eliminated. The filter circuit 11 comprises a resistor $R_{12}$ and a capacitor $C_2$.

Designated by 12 is a peak value detection circuit for detecting the peak value of the output signal from the filter circuit 11, namely, the sensor output signal from which the voltage variation component, the dark current component and the high frequency noise component have been eliminated. The peak value detection circuit 12 comprises a comparator $CP_2$, resistors $R_{13}$-$R_{15}$, transistors $Tr_6$-$Tr_{10}$, a capacitor $C_3$ and a buffer amplifier $BP_2$ and is of the same connection and construction as the dark current signal detection and hold circuit 9, thus being a constant current operating circuit. The output signal from the filter circuit 11 is applied to the non-inverting input terminal of the comparator $CP_2$ through the resistor $R_{13}$. The input to the non-inverting input terminal of the comparator $CP_2$ is controlled so as to be only the signal corresponding to the standard field image mentioned in the description of the range finding device proposed in the aforementioned U.S. Pat. No. 4,004,852, of the output signal from the filter circuit 11, by a control signal $\phi_7$ (see FIG. 6(e)) being applied to the base of the input control transistor Tr$_6$. The stored value of the capacitor C$_3$ is cleared by a control signal $\phi_8$ (see FIG. 6(f)) being applied to the base of the stored value clear transistor Tr$_{10}$ before the filter circuit output begins to be applied to the comparator CP$_2$.

Denoted by 13 is a peak value hold circuit for holding the peak value of the sensor output signal detected by the peak value detection circuit 12 for one scan period. The peak value hold circuit 13 comprises a comparator CP$_3$, resistors R$_{16}$-R$_{18}$, transistors Tr$_{11}$-Tr$_{15}$, a peak value hold capacitor C$_4$ and a buffer amplifier BP$_3$ and is of the same connection and construction as the dark current signal detection and hold circuit 9 and the peak value detection circuit 12, thus being a constant current operating circuit. The output signal from the peak value detection circuit 12, namely, the peak value information signal held by the capacitor C$_3$ is applied to the non-inverting input terminal of the comparator CP$_3$ through the resistor R$_{16}$. The application of the peak value information signal held by the capacitor C$_3$ to the non-inverting input terminal of the comparator CP$_3$ is controlled so as to take place after completion of the read-out of the sensor device output by a control signal $\phi_9$ (see FIG. 6(g)) being applied to the base of the input control transistor Tr$_{11}$. The stored value of the peak value hold capacitor C$_4$ is cleared by a control signal $\phi_{10}$ (see FIG. 6(h)) being applied to the base of the stored value clear transistor Tr$_{15}$ before the peak value information signal held by the capacitor C$_3$ is applied to the non-inverting input terminal of the comparator CP$_3$.

Designated by 14 is a voltage dividing circuit as a slice level setting circuit provided to set the slice level which provides the standard for binary-encoding the sensor output signal in accordance with the output signal from the peak value hold circuit 13, namely, the peak value voltage held by the capacitor C$_4$ (such peak value voltage being referred to as $V_p$). The voltage dividing circuit 14 comprises voltage dividing resistors R$_{19}$, R$_{20}$ and a regulating variable resistor VR$_1$ and the voltage obtained at the voltage dividing point between the resistors R$_{19}$ and R$_{20}$ (such voltage being referred to as $V_s$) is utilized as the slice level for binary-encoding the signal.

Denoted by 15 is a standard voltage setting circuit which comprises a constant voltage circuit RQ, an operational amplifier OP$_3$, resistors R$_{21}$, R$_{22}$, voltage dividing resistors R$_{23}$-R$_{26}$ and a regulating variable resistor VR$_2$. The voltage obtained at the voltage dividing point between the resistor R$_{23}$ and the resistors R$_{24}$-R$_{26}$ (such voltage being referred to as $V_{MAX}$) and the voltage obtained at the voltage dividing point between the resistors R$_{23}$-R$_{25}$ and the resistor R$_{26}$ (such voltage being referred to as $V_{MIN}$ ($<<V_{MAX}$)) are utilized as the standard voltage for detecting whether or not the peak value voltage Vp held by the peak value hold circuit 13 is within a proper level range, and the voltage obtained at the voltage dividing point between the resistors R$_{23}$, R$_{24}$ and the resistors R$_{25}$, R$_{26}$ (such voltage being referred to as $V_F$) is utilized as the slice level when the peak value voltage Vp is deviated from the aforementioned proper level range, namely, the voltage range defined by the voltage $V_{MIN}$.

Denoted by 16 is a binary encoding circuit for binary-encoding the output signal from the filter circuit 11 in two ways by using as the slice level the voltage Vs obtained at the voltage dividing point between the resistors R$_{19}$ and R$_{20}$ of the voltage dividing circuit 14, namely, the divided voltage of the peak value voltage Vp held by the peak value hold circuit 13, and the voltage $V_F$ obtained at the voltage dividing point between the resistors R$_{23}$, R$_{24}$ and the resistors R$_{25}$, R$_{26}$ of the standard voltage setting circuit 15. The binary encoding circuit 16 comprises a first binary comparator CP$_4$ using the voltage Vs as the slice level and a second binary comparator CP$_5$ using the voltage $V_F$ as the slice level. The output from the filter circuit 11 is applied to the non-inverting input terminals of the comparators CP$_4$ and CP$_5$.

Reference character 17 designates a discrimination circuit for discriminating whether the peak value voltage $V_P$ held by the peak value hold circuit 13 is within or over or under the voltage range determined by the voltages $V_{MAX}$ and $V_{MIN}$ set by the standard voltage setting circuit 15. The discrimination circuit 17 comprises an over detection comparator CP$_6$ and an under detection comparator CP$_7$. The peak value voltage Vp held by the peak value hold circuit 13 is applied to the non-inverting input terminal of the comparator CP$_6$ and the inverting input terminal of the comparator CP$_7$, the voltage $V_{max}$ is applied to the inverting input terminal of the comparator CP$_6$ and the voltage $V_{MIN}$ is applied to the non-inverting input terminal of the comparator CP$_7$. The discrimination outputs from the discrimination circuit 17, namely, the outputs from the comparators CP$_6$ and CP$_7$ (these outputs being referred to as T$_3$ and T$_4$) are utilized to determine which of the two binary signals from the binary encoding circuit 16, namely, the binary signal from the first comparator CP$_4$ (this being referred to as T$_1$) and the binary signal from the second comparator CP$_5$ (this being referred to as T$_2$), should be utilized as the binary signal for taking the image correlation, and are further utilized as the instruction signal as to whether or not the integration time (charge storing time) of the signal in the light receiving portion 2 of the sensor device 1 should be altered, and this will further be described later.

Reference is now had to FIG. 6 to describe the operation in the case where the image of an object is electrically scanned by a combination of the circuit system shown in FIGS. 3A and 3B and the sensor device 1 shown in FIG. 1. Here, description is made on the assumption that a CCD photosensor or a CCD photodiode array is used as the sensor device 1 and that by applying the image scanning device of the present invention to the automatic range finding device of the type as disclosed, for example, in U.S. Pat. No. 4,004,852, the aforementioned standard field image and reference field image are formed within different ranges on the light receiving element 2″ in the light receiving portion 2 of the sensor device 1 which is not shielded from light, by a base line range finder type optical system.

When an unshown main switch is closed at a time t$_0$, the voltage $V_E$ is applied to the input terminal 1$a$ of the sensor device 1 and the differential amplifier circuit 8 in the circuit system shown in FIGS. 3A and 3B while the voltage $V'_E$ is applied to the other circuit portion, whereby in the sensor device 1 a potential well is formed at the lower part of or near the light receiving elements 2′ and 2″ in the light receiving portion 2 and storage of the charge generated thereby is started. Next, when the start pulse $\phi_s$ is applied to the input terminal 1$b$ of the sensor device 1 at a time t$_1$, as shown in FIG. 6(b), a potential well is formed thereby in the transfer gate portions $3_1$ and $3_2$ each and the stored charge in the light receiving elements of odd number groups, for example, of the light receiving elements $2''$ and $2'$ is taken into the charge transfer portion $4_1$ through the transfer gate portion $3_1$ and the stored charge in the light receiving elements of even number groups is taken into the charge transfer portion $4_2$ through the transfer gate portion $3_2$ and at this time, clock pulses of relatively high frequency are applied as the transfer clocks $\phi_1$–$\phi_4$ and reset pulse $\phi_R$ to the input terminals $1c$–$1g$, whereby all the stored charges in the light receiving elements $2''$ and $2'$ are transferred to the output portion 5 during the time from a time $t_2$ to a time $t_3$ and as shown in FIG. 6(a), these charges may be put out as a voltage or a current from the output terminal $1i$ in time series fashion, during the time from the time $t_2$ to the time $t_3$. In FIG. 6(a), the sensor output signal obtained from this output terminal $1i$ is shown as a waveform signal, but actually this is obtained as a time series pulse signal as is well-known. It is not ensured that the sensor output signal obtained during the time from the time $t_2$ to the time $t_3$ accurately corresponds to the aforementioned standard field image and reference field image and therefore, it is treated here as an unnecessary signal. Accordingly, read-out of the sensor device output in this cycle corresponds to the sequence for eliminating the stored charges in the light receiving elements $2''$ and $2'$ as unnecessary charges and this is the reason why the clock pulses of relatively high frequency are applied as the transfer clocks $\phi_1$–$\phi_4$ and the reset pulse $\phi_R$. Of course, in this case, the processing of the then sensor device output by the circuit system of FIGS. 3A and 3B does not take place. In the light receiving element $2''$ which is not shielded from light, storage of the generated charge corresponding to each minute image element in the standard field image and reference field image is newly started at a point of time whereat the start pulse $\phi_s$ falls from high to low.

Next, when the start pulse $\phi_s$ is again applied to the input terminal $1b$ at a time $t_4$, the stored charge in the light receiving element $2'$ and the stored charge in the light receiving element $2''$ corresponding to the brightness of each image element are separately taken into the charge transfer portions $4_1$ and $4_2$ in the fashion of odd number group and even number group (accordingly, the time from after the start pulse $\phi_s$ is imparted at the time $t_1$ until it is now again imparted at the time $t_4$—the time indicated by Ti in FIG. 6(b)—is the integration time in the light receiving portion 2, namely, the storing time of the charge) and at this time, clock pulses of relatively low frequency are applied as the transfer clocks $\phi_1$–$\phi_4$ and reset pulse $\phi_4$ to the input terminals $1c$–$1g$, whereby, for example, during the period from a time $t_5$ to a time $t_{13}$, the stored charges in the light receiving elements $2'$ and $2''$ are transferred to the output portion 5 and as shown in FIG. 6(a), the charges may be put out as a voltage of a current from the output terminal $1i$ during the period from the time $t_5$ to the time $t_{13}$, in time series fashion. The sensor output signal obtained in this cycle of read-out is processed as an effective signal by the subsequent analog processing circuit, and it is for the purpose of decreasing the read-out speed of the sensor output signal and alleviating the response characteristic of the analog processing circuit that clock pulses of relatively low frequency are used as the transfer clocks $\phi_1$–$\phi_4$ and reset pulse $\phi_4$ to be applied to the input terminals $1c$–$1g$ in this cycle of read-out.

The sensor output signal obtained from the output terminal $1i$ during this cycle of read-out is applied to the inverting input terminal of the operational amplifier $OP_1$ in the differential amplifier circuit 8 while, on the other hand, in the sensor device 1, the variation in the voltage within the sensor device for the variation in the voltage $V_E$ imparted to the input terminal $1a$ is detected by the voltage variation detecting portion 7 and a voltage variation information signal is put out from the output terminal $1j$ and applied to the non-inverting input terminal of the operational amplifier $OP_1$ in the differential amplifier circuit 8. Therefore, assuming that the output from the output terminal $1i$ is $V_1$ and the output from the output terminal $1j$ is $V_2$, the output $V_{OP1}$ of the operational amplifier $OP_1$ is represented by $$V_{OP1} = \frac{r_4}{r_3 + r_4} \cdot \frac{r_1 + r_2}{r_1} \cdot V_2 - \frac{r_2}{r_1} \cdot V_1$$

(where $r_1$–$r_4$ are the resistance values of the resistors $R_1$–$R_4$) and if $r_1 = r_2 = r_3 = r_4$, then $$V_{OP1} = V_2 - V_1,$$

so that a signal from which the voltage variation component has been eliminated appears at the output terminal of the differential amplifier circuit 8, whereby after all it is possible to eliminate the voltage variation component in the sensor output signal.

On the other hand, in this cycle of read-out of the sensor device output, a signal corresponding to the stored charge in the light receiving element $2'$ in the light receiving portion 2 which is shielded from light is obtained, for example, during the period from the time $t_5$ to the time $t_8$, and when the control signal $\phi_6$ applied to the base of the transistor $Tr_5$ in the dark current signal detection and hold circuit 9 becomes high during the period from the time $t_5$ to the time $t_6$ as shown in FIG. 6(d), the transistor $Tr_5$ is thereby rendered conductive during this period of time so that the charge in the capacitor $C_1$ is cleared and thereafter, the control signal $\phi_5$ applied to the base of the input control transistor $Tr_1$ becomes low during the period from the time $t_6$ to the time $t_7$ as shown in FIG. 6(c), whereby the transistor $Tr_1$ is rendered nonconductive so that part of the output of the differential amplifier circuit 8, namely, a signal corresponding to the stored charge in the light receiving element $2'$ which is shielded from light is applied to the non-inverting input terminal of the comparator $CP_1$ in the form wherein the voltage variation component has been eliminated, only during the time period for which the transistor $Tr_1$ is rendered non-conductive, namely, during the period from the time $t_6$ to the time $t_7$. On the other hand, since the inverting input terminal of the comparator $CP_1$ is connected to the capacitor $C_1$, the non-inverting input potential becomes higher than the inverting input potential at the point of time whereat the transistor $Tr_1$ becomes nonconductive to impart the output of the differential amplifier circuit 8, so that the output of the comparator $CP_1$ is inverted from low to high and thus, the transistor $Tr_2$ becomes conductive and the base collector thereof is short-circuited and a constant current $IR_6$ determined by the resistor $R_6$ flows through a transistor $Tr_4$ which acts as a diode while, at the same time, the transistor $Tr_3$ becomes conductive to start charging of the capacitor $C_1$ by a current flowing through the transistor $Tr_3$. Assuming here that the resistance value of the resistor $R_7$ is sufficiently higher than that of the resistor $R_6$ and if the base current of the transistor $Tr_3$ is neglected, then the base-emitter voltages $V_{BE4}$ and $V_{BE3}$ of the transistors $Tr_4$ and $Tr_3$ become:

$$V_{BE4} = \frac{KT}{g} \ln\left(\frac{IR_6}{i_o} + 1\right)$$

$$V_{BE4} = \frac{KT}{g} \ln\left(\frac{I_1}{i_o} + 1\right)$$

where K is a Boltzmann constant, T is an absolute temperature, g is the prime amount of charge, $i_o$ is the saturation current in the reverse direction, $IR_6$ is a current flowing throuth the resistor $R_6$, and $I_1$ is the charging current of the capacitor $C_1$.

In the present circuit, $V_{BE4}=V_{BE3}$ and hence, $IR_6=I_1$ and the capacitor $C_1$ is charged with a constant current equivalent to the current flowing through the resistor $R_6$.

When the potential of the capacitor $C_1$ is increased and the inverting input potential of the comparator $CP_1$ exceeds the non-inverting input potential thereof, the output of the comparator $CP_1$ is inverted from high to low, whereby the transistor $Tr_2$ becomes non-conductive and therefore, the transistor $Tr_3$ becomes non-conductive so that the charging of the capacitor $C_1$ is cut off and after all, in the dark current signal detection and hold circuit 9, the detection and hold of the dark current signal is effected on the basis of part of the signal corresponding to the stored charge in the light receiving element 2' which is shielded from light, out of the output signal from the differential amplifier circuit 8, in the manner as described above, and the dark current information signal held by the capacitor $C_1$ is put out through a buffer amplifier $BP_1$.

The resistor $R_7$ is for eliminating delay of the switching of transistor $Tr_3$ attributable to the joined capacity of the diode-connected transistor $Tr_4$ when the transistor $Tr_2$ has become non-conductive. Incidentally, the delay of the inverting operation of the comparator $CP_1$ and the transistors $Tr_2$ and $Tr_3$ is constant and therefore, assuming that irrespective of the variation in the output voltage of the differential amplifier circuit 8, the charging of the capacitor $C_1$ is cut off after a predetermined time ($t_D$) from the point of time whereat the inverting input potential of the comparator $CP_1$ exceeds the now inverting input potential thereof, then the detection error voltage $\Delta V$ based on the over charge of the capacitor $C_1$ resulting from the response delay of the circuit system becomes $$\Delta V = (t_D \cdot I_1)/C_q$$

(where $C_q$ is the capacitance of the capacitor $C_1$) and accordingly, by shifting the offset voltage of the comparator $CP_1$ or the buffer amplifier $BP_1$ by a voltage corresponding to this error voltage $\Delta V$, or by connecting a differential amplifier circuit to the output terminal of the buffer amplifier $BP_1$ and subtracting this error voltage $\Delta V$, a voltage corresponding to the dark current signal voltage with high accuracy may be obtained.

During the period from the time $t_8$ to the time $t_{13}$, there is obtained a signal corresponding to the stored charge in the light receiving element 2" which is not shielded from light, namely, a signal including scanning signals regarding the standard field image and reference field image formed on the light receiving element 2", and this is applied to the non-inverting input terminal of the operational amplifier $OP_2$ in the next differential amplifier circuit 10 after the voltage variation component has been eliminated from said signal by the differential amplifier circuit 8 while, on the other hand, the dark current information signal detected and held by the dark current signal detection and hold circuit 9 during the period from the time $t_6$ to the time $t_7$ is being applied to the inverting input terminal of the operational amplifier $OP_2$ at this time and accordingly, assuming that the voltage of the dark current detection and hold circuit 9 is $V_{BP1}$, then the output $V_{OP2}$ of the operational amplifier $CP_2$, like the output $V_{OP1}$ of the operational amplifier $OP_1$ in the differential amplifier circuit 8, is represented by $$V_{OP2} = \frac{r_9}{r_8 + r_9} \cdot \frac{r_{10} + r_{11}}{r_{10}} \cdot V_{OP1} - \frac{r_{11}}{R_{10}} \cdot V_{BP1}$$

(where $r_8$–$r_{11}$ are the resistance values of the resistors $R_8$–$R_{11}$) and if $r_8=r_9=r_{10}=r_{11}$, $$V_{OP2} = V_{OP1} - V_{BP1}$$

Thus, a signal from which the dark current component has been eliminated appears at the output terminal of the differential amplifier circuit 10 and thereby, after all, it is possible to further eliminate the dark current component from the sensor output signal.

The output from the differential amplifier circuit 10 is subsequently applied to the filter circuit 11, where the high frequency noise component is eliminated from said output, whereafter the output, whereafter the output is imparted to the binary encoding circuit 16 and the peak value detection circuit 12. In the peak value detection circuit 12, as shown in FIG. 6(f), the control signal $\phi_8$ applied to the base of the transistor $Tr_{10}$ becomes high during the period from the time $t_5$ to the time $t_9$, whereby the transistor $Tr_{10}$ conducts during this time period to clear the charge of the capacitor $C_3$ and after this clearing of the charge of the capacitor $C_3$, the control signal $\phi_7$ applied to the base of the input control transistor $Tr_6$ becomes low during the period from the time $t_9$ to the time $t_{10}$ as shown in FIG. 6(e), whereby the transistor $Tr_6$ is rendered non-conductive during this time period and of the output from the filter circuit 11, only the output during the period from the time $t_9$ to the time $t_{10}$ for which the transistor $Tr_6$ is rendered nonconductive, namely, only the output corresponding to the standard field image formed on the light receiving element 2" which is not shielded from light, as will be appreciated from FIGS. 6(a) and (e), is applied to the non-inverting input terminal of the comparator $CP_2$. The signal obtained during the period from the time $t_8$ to the time $t_9$ corresponds to the signal from the light receiving element of the light receiving elements 2" which is adjacent to the standard field image and is not a scanning signal regarding the standard field image and therefore, only a signal corresponding to the standard field image may be accurately imparted to the comparator $CP_2$ by inverting the control signal $\phi_7$ from high to low at the time $t_9$.

When, at the time $t_9$, the output from the filter circuit 11, namely, the scanning output regarding the standard field image from which the voltage variation component, the dark current component and the high frequency noise component have been eliminated, is applied to the non-inverting input terminal of the comparator CP₂, the output of the comparator CP₂ is inverted from low to high at the point of time whereat the output from the filter circuit 11 has been applied to the non-inverting input terminal thereof, because the comparator CP₂, like the comparator CP₁ in the dark current signal detection and hold circuit 9, has the inverting input terminal thereof connected to the capacitor C₃, whereby the transistors Tr₇ and Tr₈ conduct to permit the capacitor C₃ to be charged with a constant current equivalent to the current flowing through the resistor R₁₄ in the same manner as in the case of the dark current signal detection and hold circuit 9 and when the charging voltage of the capacitor C₃ exceeds the output potential from the filter circuit 11, the output of the comparator CP₂ is inverted from high to low to cut off the charging of the capacitor C. Thereafter, in the peak value detection circuit 12, such operation is repeated until the time t₁₀ elapses that when the non-inverting input potential of the comparator CP₂ exceeds the inverting input potential thereof in accordance with the variation in the output from the filter circuit 11, the charging of the capacitor C₃ is again started and when the inverting input potential of the comparator CP₂ exceeds the non-inverting input potential thereof, the charging of the capacitor C₃ is cut off, and at the point of time whereat the time t₁₀ finally elapses and the transistor Tr₆ conducts to thereby cut off the applying of the output from the filter circuit 11 to the non-inverting input terminal of the comparator CP₂, a voltage corresponding to the maximum value of the output from the filter circuit 11 during from the time t₉ to the time t₁₀, or in other words, the peak value of the scanning output regarding the standard field image, is held by the capacitor C₃ and thereby after all, it becomes possible to detect the peak value of the scanning output signal regarding the standard field image. As the time progresses to t₁₁, t₁₂ and t₁₃, from the scanning signal obtained, the voltage variation component is eliminated in the differential amplifier circuit 8, as described, and the high frequency noise component is further eliminated in the filter circuit 11 and the scanning signal is applied to the binary encoding circuit 16. Of the signals obtained between the time t₁₀ and the time t₁₃, the signals obtained between the time t₁₀ and the time t₁₁ and between the time t₁₂ and the time t₁₃, like the signals obtained between the time t₈ and the time t₉, are unrelated to the field image and only the signal obtained between the time t₁₁ and the time t₁₂ corresponds to the scanning optical system regarding the reference field image.

After the time t₁₃ elapses and the read-out of the sensor device output is terminated and when the control signal φ₁₀ applied to the base of the transistor Tr₁₅ in the peak value hold circuit 13 becomes high during from the time t₁₄ to the time t₁₅, as shown in FIG. 6(h), the transistor Tr₁₅ is thereby rendered conductive during this time period to clear the charge in the capacitor C₄ and after the clearing of the charge in the capacitor C₄, the control signal φ₉ applied to the base of the input control transistor Tr₁₁ becomes low during from the time t₁₅ to the time t₁₆, as shown in FIG. 6(g), whereby the transistor Tr₁₁ is rendered non-conductive during this time period, so that the output from the peak value detection circuit 12 is applied to the non-inverting input terminal of the comparator CP₃ and in the same manner as in the dark current signal detection and hold circuit 9 and the peak value detection circuit 12, the capacitor C₄ is charged to a level corresponding to the non-inverting input potential of the comparator CP₃ and after all, a voltage corresponding to the peak value of the scanning output signal regarding the standard field image detected by the peak value detection circuit 12 is held by the capacitor C₄. The hold voltage of the capacitor C₄ is applied as the peak value voltage Vp to the discrimination circuit 17 and the voltage dividing circuit 14 through the buffer amplifier BP₃. In discrimination circuit 17, the over detection comparator CP₆ detects whether or not the peak value voltage Vp exceeds the upper limit standard voltage $V_{max}$ set by the standard voltage setting circuit 15, and the under detection comparator CP₇ detects whether or not the peak value voltage Vp is below the lower limit standard voltage $V_{MIN}$ and after all, assuming that the outputs of the comparators CP₆ and CP₇ are T₃ and T₄, respectively, discrimination results corresponding to the level of the peak value voltage Vp may be provided by a combination of the outputs T₃ and T₄ of the comparators CP₆ and CP₇ in such a manner that both T₃ and T₄ are low when $V_{MAX} \geq Vp \geq V_{MIN}$, T₃ is high and T₄ is low when $Vp > V_{MAX}$ and T₃ is low and T₄ is high when $Vp < V_{MIN}$.

On the other hand, in the voltage dividing circuit 14, a voltage Vs represented by $$V_s = \frac{\frac{Vp}{r_{10}}}{\frac{1}{r_{19}} + \frac{1}{r_{20}} + \frac{1}{Vr_1}}$$

(where $r_{19}$, $r_{20}$ and $Vr_1$ are the resistance values of the resistors $R_{19}$ and $R_{20}$ and variable resistor $VR_1$) appears at the output terminal thereof and this is imparted as a slice level for signal binary encoding to the inverting input terminal of the first binary comparator CP₄ in the binary encoding circuit 16. Also, at this time, a specific voltage $V_F$ between the voltage $V_{MAX}$ and the voltage $V_{MIN}$ set by the standard voltage setting circuit 15 is imparted as the slice level for signal binary encoding to the inverting input terminal of the second binary comparator CP₅ in the binary encoding circuit 16.

If the voltage Vs as the slice level obtained in the voltage circuit 14 is rendered such that Vs=0.6–0.8 Vp with respect to the peak value voltage Vp, the influence of the noise signal in the circuit may be eliminated to provide a relatively good binary data. As regards the voltage $V_F$ as the fixed slice level obtained in the standard voltage setting circuit 15, it may be determined in various ways, but for example, a level intermediate of the $V_{MAX}$ and the $V_{MIN}$, namely, a voltage level obtained from $$V_F = \frac{V_{MAX} + V_{MIN}}{2}$$

or an intermediate level as step number, namely, a voltage level obtained from $$V_F = \sqrt{V_{MAX} \times V_{MIN}}$$

will be relatively satisfactory.

In this state, when the time progresses to t₁₇, the elimination of unnecessary charge in the sensor device 1, namely, high-speed read-out of the sensor device output takes place again and this is terminated during the period from the time $t_{18}$ to the time $t_{19}$ and when the time further progresses to $t_{20}$, low-speed read-out of the sensor device output for obtaining an effective signal is again initiated and the scanning output signal obtained at this time is applied to the non-inverting input terminals of the comparators $CP_4$ and $CP_5$ in the binary encoding circuit 16 after the voltage variation component, the dark current component and the high frequency noise component have been eliminated therefrom through the differential amplifier circuits 8 and 10 and the filter circuit 11. Accordingly, binary encoding of the aforementioned scanning signal having as the slice level the voltage Vs set on the basis of the peak value voltage Vp detected in the previous cycle is effected by the first comparator $CP_4$ and this is obtained as the output $T_1$ while, at the same time, binary encoding of the aforementioned scanning output signal having as the slice level the voltage $V_F$ set by the standard voltage setting circuit 15 is effected by the second comparator $CP_5$ and this is obtained as the output $T_2$.

During the read-out of the sensor device output in this cycle, the detection and hold of the dark current signal is effected by the dark current signal detection and hold circuit 9 during the period from the time $t_{22}$ to the time $t_{23}$ and, on the basis of the result thereof, elimination of the dark current component is effected by the differential amplifier circuit 10. Also, during the period from the time $t_{25}$ to the time $t_{26}$, peak value detection is again effected by the peak value detection circuit 12 and after the time has reached $t_{29}$ and the read-out of the sensor device output has been terminated, and when the time reaches $t_{30}$, the peak value voltage Vp held by the peak value hold circuit 13 is cleared, and at the time $t_{31}$, it is rewritten into the peak value detected by the peak value detection circuit 12 during the period from the time $t_{25}$ to the time $t_{26}$, and the output voltage Vs of the voltage dividing circuit 14 obtained at this time is utilized as the slice level for the binary encoding of the scanning output signal obtained in the next cycle of read-out of the sensor device output as an effective signal.

Thereafter, the above described operation is repeated and each time an effective signal is read out from the sensor device 1, two different binary data regarding the standard field image and the reference field image formed on the sensor device 1, namely, binary data $T_1$ having the voltage Vs as the slice level and binary data $T_2$ having the voltage $V_F$ as the slice level are obtained from the binary encoding circuit 16, and discrimination outputs ($T_3$, $T_4$) discriminating whether the peak value voltage Vp held by the peak value hold circuit 13 is within or over or below the voltage range determined by the voltages $V_{MAX}$ and $V_{MIN}$ is obtained from the discrimination circuit 17.

Figure 4B:
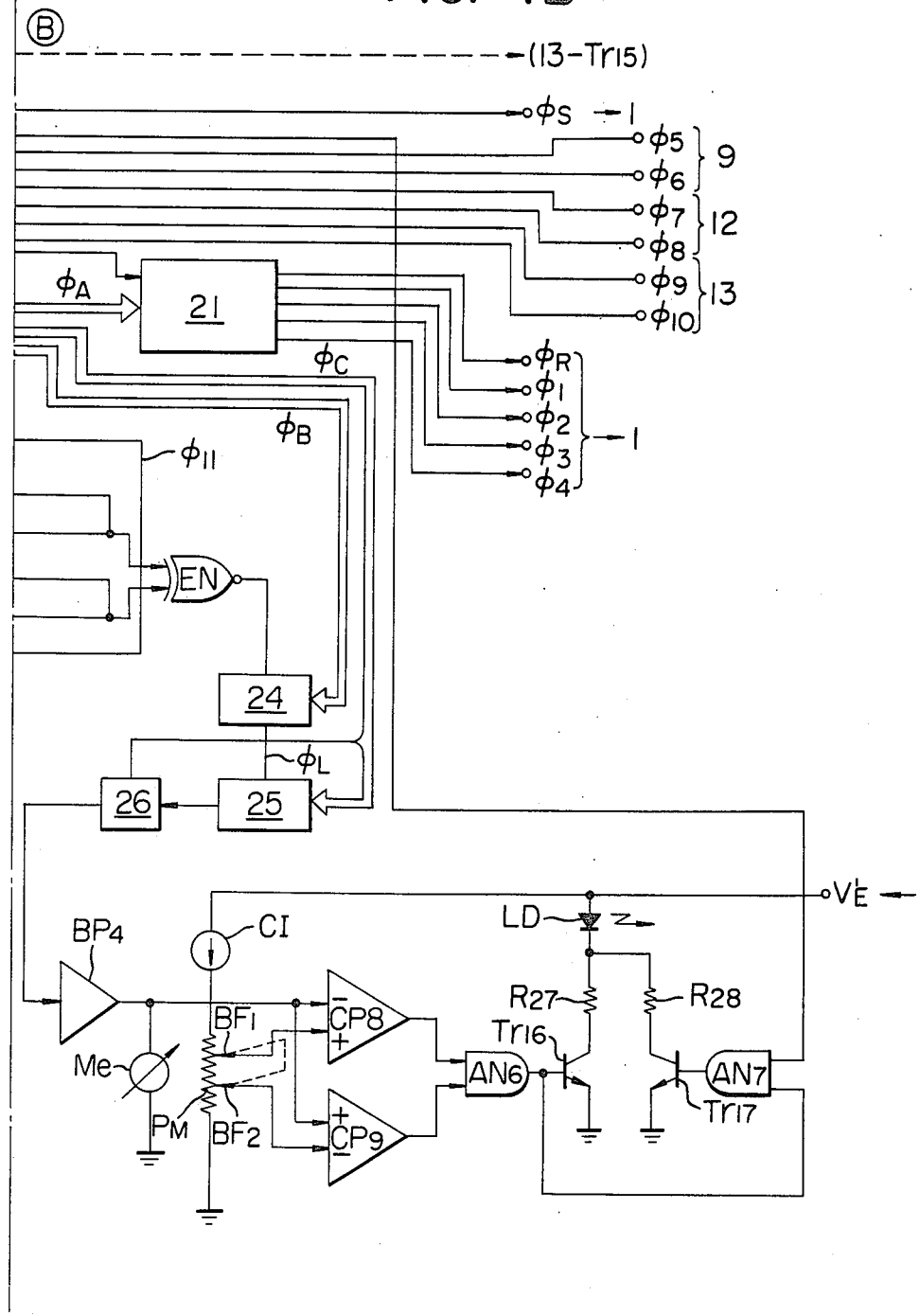

Now, according to the combination of the sensor array device shown in FIG. 1 and the circuit system shown in FIGS. 3A and 3B, an object image is scanned in the described manner and ultimately, there is obtained data $T_1$ which is the result of the binary encoding of the image scanning output of the slice level Vs determined on the basis of the peak value voltage Vp, data $T_2$ which is the result of the binary encoding of the image scanning output by the fixed slice level $V_F$, and discrimination outputs $T_3$ and $T_4$ regarding whether or not the peak value voltage Vp is within a predetermined voltage range $V_{MAX}$-$V_{MIN}$. Reference is now had to FIG. 4 to describe an example of the circuit for determining which of the two different binary data $T_1$ and $T_2$ should be utilized as the effective data, on the basis of the discrimination outputs $T_3$ and $T_4$, and for controlling the integration time in the sensor device 1. The circuit system shown in FIG. 4 is an example of the circuit system which is applicable, for example, to the electronic distance detecting device as proposed in the aforementioned U.S. Pat. No. 4,004,852, and an example of the circuit for selecting the two different binary data $T_1$ and $T_2$ concerned with the present invention and for controlling the integration time of the sensor device 1 is shown as a part of FIG. 4.

Description will first be made of the construction of such circuit system. Designated by 18 is a data selecting circuit for determining which of the two different binary image data $T_1$ and $T_2$ from the binary encoding circuit 16 should be utilized, on the basis of the discrimination outputs $T_3$ and $T_4$ from the discrimination circuit 17. The data selecting circuit 18 comprises an OR gate $OR_1$ for taking the logic sum of the discrimination outputs $T_3$ and $T_4$, an AND gate $AN_1$ for taking the logic product of the binary data $T_1$ put out from the comparator $CP_4$, of the two different binary data from the binary encoding circuit 16, and the inverted output of the output of the OR gate $OR_1$ inverted by an inverter $IN_1$, and AND gate $AN_2$ for taking the logic product of the binary data $T_2$ put out from the comparator $CP_5$, of the two different binary data from the binary circuit 16, and the output of the OR gate $OR_1$, and an OR gate $OR_2$ for taking the logic sum of the outputs of these AND gates $AN_1$ and $AN_2$.

Designated by 19 is a basic clock generating circuit for generating a basic clock pulse CLK which provides the basis for the circuit system of FIG. 4 to perform a sequential operation. Denoted by 20 is a sequence control signal generating circuit for generating various control signals for the sequential control of various circuit portions, to be described, in addition to the aforementioned control signals $\phi_5$–$\phi_{10}$ to be applied to the dark current signal detection and hold circuit 9, the peak value detection circuit 12 and the peak value hold circuit 13, on the basis of the basic clock pulse CLK put out from the basic clock generating circuit 19. The sequence control signal generating circuit 20 comprises a frequency dividing counter, a group of logic gates, etc. Reference character 12 designates a driver circuit for putting out the transfer clocks $\phi_1$–$\phi_4$ and reset pulse $\phi_R$ to be applied to the sensor device 1 on the basis of the basic clock pulse CLK put out from the basic clock generating circuit 19. The driver circuit 21 comprises a frequency dividing counter, a group of logic gates, etc. and has the function of selectively putting out two different transfer clocks and reset pulses, namely, a transfer clock and reset pulse of relatively high frequency for the elimination of unnecessary charge in the sensor device 1 (i.e. high-speed read-out of the sensor device output) and a transfer clock and reset pulse of relatively low frequency for the taking-out of effective scanning output (i.e. low-speed read-out of the sensor device output). The sequence control signal generating circuit 20 applies to the driver circuit 21 an instruction signal $\phi A$ for selectively instructing high-speed read-out and low-speed read-out and selectively puts out a high frequency transfer clock and a low frequency transfer clock to the driver circuit 21 in accordance with the instruction signal $\phi A$.

$SR_1$ is a shift register for storing the binary image element data regarding the standard field image, and $SR_2$ and $SR_3$ are shift registers for storing the binary image element data regarding the reference field image (that is, as described above, since the reference field is set more greatly than the standard field, the image element data regarding the reference field image are more than the image element data regarding the standard field image and accordingly, the shift register $SR_1$ of M bit construction is applied for M successive image element data regarding the standard field image while a combination of the shift register $SR_2$ of M bit configuration and the shift register $SR_3$ of (N-M) bit configuration is applied for N (>M) successive image element data regarding the reference field image). The shift registers $SR_1$ and $SR_2$ are both series input-series output circulation type shift registers of the same number bit configuration and the shift register $SR_3$ is a series input-series output type shift register, and the shift operations thereof are all controlled by drive clocks $\phi_{11}$, $\phi_{12}$ and $\phi_{13}$ inparted thereto from the sequence signal generating circuit 20.

Designated by 23 is a data distributing circuit for distributing M data regarding the standard field image, of the binary image data selected by the data selecting circuit 18, to the shift register $SR_1$ and for distributing N data regarding the reference field image to the shift registers $SR_2$ and $SR_3$. The operation of the data distributing circuit 23 is controlled by the control signal $\phi D$ from the sequence control signal generating circuit 20.

EN is an exclusive NOR gate for putting out a "1" signal when the data of each bit are coincident, namely, are both "1" or both "0", during the circulation of the data in the shift registers $SR_1$ and $SR_2$, and for putting out a "0" signal when the data of each bit are not coincident. Denoted by 24 is a maximum coincidence number detection circuit for counting the number of "1" outputs from the exclusive NOR gate EN, namely, the number of coincidences between the data in the shift registers $SR_1$ and $SR_2$, during each circulation of data in these shift registers $SR_1$ and $SR_2$ and for detecting a maximum value of the coincidence number obtained during each circulation of data in the shift registers $SR_1$ and $SR_2$. Specifically, the maximum coincidence number detection circuit 24 comprises a counter for counting the number of "1" outputs from the exclusive NOR gate EN, a register for storing the count of the counter, and a comparator for comparing the magnitudes of the contents of the counter and the register. In this case, the comparator applies a load signal to the register only when it detects the state of "the content of the counter > the content of the register", and the register is designed to take in the content of the counter in response to the load signal from this comparator. The counting operation of the counter and the comparing operation of the comparator are controlled by respective signals included in the control signal $\phi B$ from the sequence control signal generating circuit 20.

Designated by 25 is a data shift amount detection circuit for detecting the amount of shift of the data in the shift registers $SR_2$ and $SR_3$ required for the number of coincidences between the data in the shift registers $SR_1$ and $SR_2$ to become maximum (that is, the amount of relative shift of the N data regarding the reference field image to the M data regarding the standard field image and this may be detected by the frequency with which the data stored in the shift register $SR_3$ is taken into the shift register $SR_2$). The data shift amount detection circuit 25 comprises a counter for counting the number of signals indicative of the taking into the shift register $SR_2$ of the data stored in the shift register $SR_3$ included in the control signal $\phi C$ from the sequence control signal generating circuit 20, and a register responsive to the load signal $\phi L$ put out from the comparator in the maximum coincidence number detection circuit 24 to take in the content of the counter. The counting operation of the counter is controlled by a specific signal included in the control signal $\phi C$.

Here, the content left in the register within the data shift amount detection circuit 25 at a point of time whereat the processing of the aforementioned binary image data has all been completed represents the amount of shift of the binary image element data regarding the reference field image until the number of coincidences between the data in the shift registers $SR_1$ and $SR_2$ becomes maximum, or in other words, until M successive binary image element data regarding the image portion of the reference field image which may be regarded as being coincident with the standard field image or which is most similar to the standard field image becomes stored in the shift register $SR_2$, and this apparently represents the information on the distance to the target object, from the fact that the standard field image and the reference field image are formed on the light receiving element 2" in the light receiving portion 2 of the sensor device by a base line range finder type optical system, or from the distance measuring principle in the aforementioned U.S. Pat. No. 4,004,852.

Reference character 26 denotes a D/A converter circuit for taking in the digital signal stored in the register within the data shift amount detection circuit 25 in response to the data take-in signal included in the control signal $\phi C$ from the sequence control signal generating circuit 20 imparted at a point of time whereat the processing of the above-described binary image data has all been completed and for converting such digital signal into an analog signal as the distance signal. $BP_4$ in a buffer amplifier for impedance conversion, Me is a meter for indicating the object distance, CI is a constant current source, PM is a potentiometer adapted to put out an adjusted position information of an unshown adjustable optical system which is to be focused to a target object (for example, the picture-taking optical system of a camera) by slidable brushes $BF_1$ and $BF_2$ being operatively associated with such optical system, and $CP_8$ and $CP_9$ are comparators for receiving as inputs the object distance signal imparted from the buffer amplifier $BP_4$ and the adjusted position information signal of the optical system imparted through the brushes $BF_1$ and $BF_2$ of the potentiometer and for detecting whether or not the optical system is in a proper focus range with respect to the target object. The comparator $CP_8$ is adapted to receive the output of the buffer amplifier $BP_4$ at the inverting input terminal thereof and to receive the voltage level from the brush $BF_1$ at the non-inverting input terminal, and the comparator $CP_9$ is adapted to receive the output of the buffer amplifier $BP_4$ at the non-inverting input terminal thereof and to receive the voltage level from the brush $BF_2$ at the inverting input terminal thereof. $AN_6$ is an AND gate for taking the logic product of the outputs of these two comparators $CP_8$ and $CP_9$. The output of the AND gate $AN_6$ is imparted to the base of a switching transistor $Tr_{16}$ for controlling a display light-emitting diode LD and accordingly, during the adjustment of the optical system, when both the outputs of the comparators $CP_8$ and $CP_9$ have become high (that is, when the output level of the buffer amplifier $BP_4$ is within the voltage range determined by the two voltage levels obtained through the brushes $BF_1$ and $BF_2$ of the potentiometer PM—this means that the optical system has been adjusted within a proper focus range with respect to the target object), the transistor $Tr_{16}$ conducts whereby the light-emitting diode LD emits a quantity of light corresponding to the current value determined by the resistor $R_{27}$, thus indicating that the optical system has been adjusted within the proper focus range with respect to the target object.

Here, by using a combination of the brush $BF_1$ or $BF_2$ of the potentiometer PM and the comparator $CP_8$ or $CP_9$ instead of combinations of all these (of course, in that case, the AND gate $AN_6$ may be omitted), such design may be made that the information on the position of the optical system is represented by a single voltge level (this means that the position of the optical system is represented as a "point"), but this requires the optical system to be exactly adjusted to a single "point" indicated by the output of the buffer amplifier $BP_4$ during the adjustment of the optical system and practically offers a great inconvenience, and therefore it would be more practical to make such a design that the position of the optical system is represented by a certain voltage range (this means that the position of the optical system is represented not as a "point" but as a "range" having a certain width) by the combinations of the brushes $BF_1$, $BR_2$ of the potentiometer and the comparators $CP_8$, $CP_9$ as described above.

Of course, in this case, the narrower the voltage range determined by the two voltage levels obtained through the brushes $BF_1$ and $BF_2$ of the potentiometer PM, the more enhanced the accuracy of the focus adjustment, but actually the design may be made such that an allowable width is set in accordance with the numerical data, for example, the depth of focus, of the optical system.

Designated by 27 is a slice failure detection circuit for detecting whether or not there is a failure during the binary transformation of the image scanning output, on the basis of the data regarding the standard field image, out of the image data selected by the data selecting circuit 18. The slice failure detection circuit 27 comprises an AND gate $AN_3$ for taking the logic product of the control signal $\phi_{16}$ (see FIG. 6(r)) imparted from the sequence control signal generating circuit 20 and the image data inparted from the data selecting circuit 18, an AND gate $AN_4$ for taking the logic product of the control signal $\phi_{30}$ and the inverted data of the image data inverted by an inverter $IN_2$, a D-type flip-flop $FP_1$ for receiving the output of the AND gate $AN_3$ at the D input terminal thereof, a D-type flip-flop $FP_2$ for receiving the output of the AND gate $AN_4$ at the D input terminal thereof, and a NAND gate $AN_5$ for taking the inverted logic product of the Q outputs of the two flip-flops $FP_1$ and $FP_2$. The output of the NAND gate $AN_5$ is imparted to the sequence control signal generating circuit 20.

The flip-flops $FP_1$ and $FP_2$ are cleared by the clear signal $\phi_{17}$ (see FIG. 6(g)) imparted from the sequence control signal generating circuit 20 before the image data from the data selecting circuit 18 is imparted to the AND gates $AN_3$ and $AN_4$, and the flip-flops $FP_1$ and $FP_2$ are driven by the drive clock $\phi_{11}$ to the shift register $SR_1$.

Figure 5B:
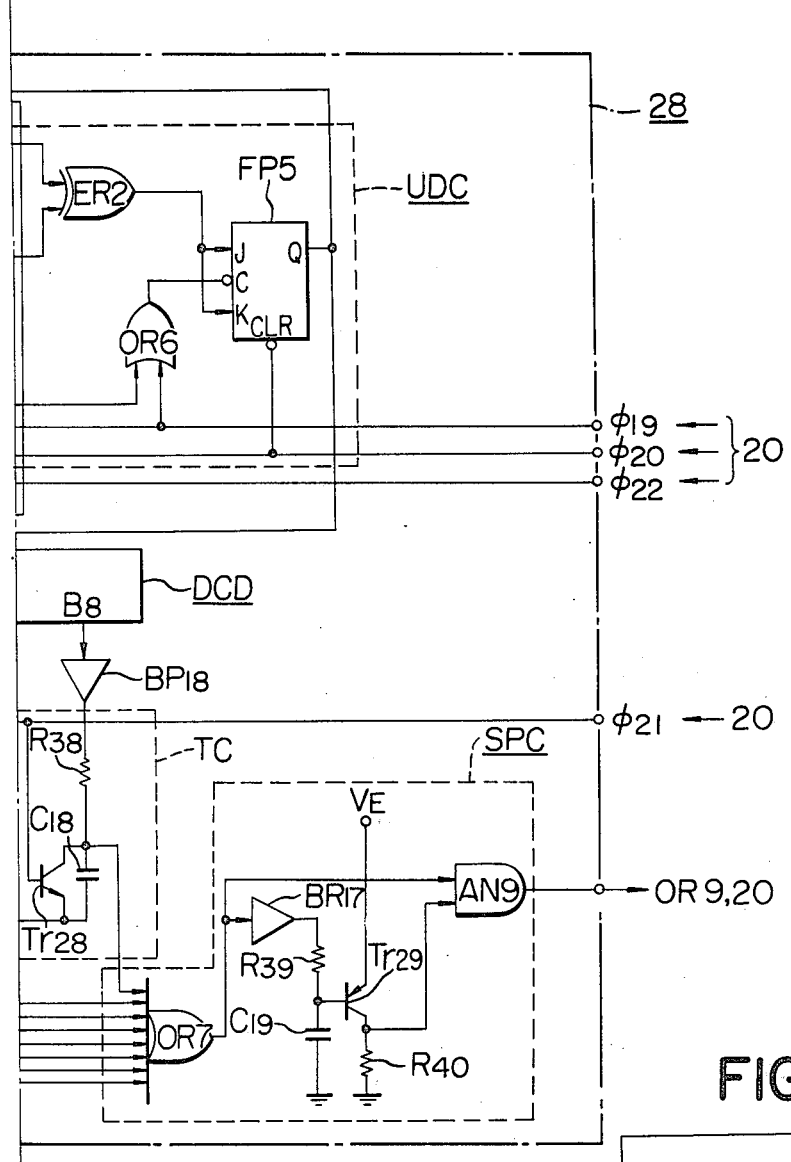
FIGS. 5, 5A and 5B are diagrams showing the details of the construction of the integration time control circuit in the circuit system of FIG. 4.
Figure 5:
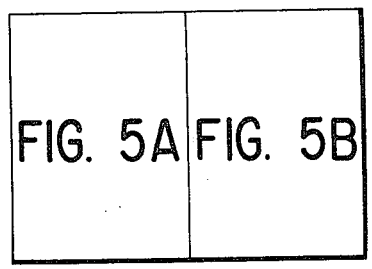
Figure 5A:
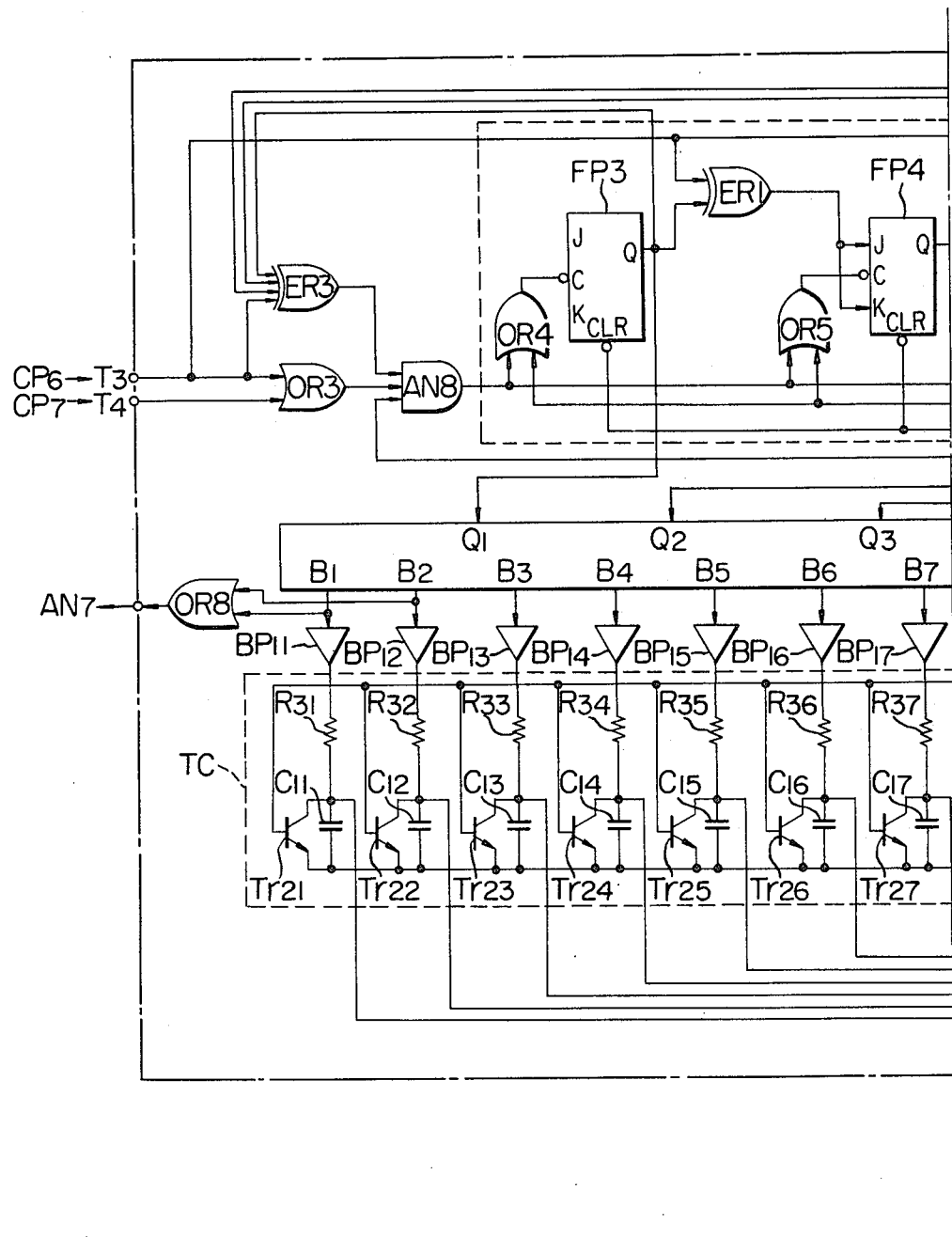

Denoted by 28 is an integration time control circuit for controlling the integration time of the sensor device 1 on the basis of the discrimination outputs $T_3$ and $T_4$ from the discrimination circuit 17. Details thereof are shown in FIG. 5.

In the Figure, UCD is an up-down counter comprising OR gates $OR_4$–$OR_6$, J-K type flip-flops $FP_3$–$FP_5$ and exclusive OR gates $ER_1$ and $ER_2$. The UCD counts the integration time initial setting pulse $\phi_{19}$ (see FIG. 6(j)) imparted from the sequence control signal generating circuit 20 and thereafter is responsive to an integration time changing pulse $\phi_{22}$ (see FIG. 6(k)) only when such pulse is imparted from the sequence control signal generating circuit 20 through an AND gate $AN_8$, to count up or count down. The flip-flops $FP_3$–$FP_5$ are cleared by a clear pulse $\phi_{20}$ (see FIG. 6(i)) put out from the sequence control signal generating circuit 20 in response to closing of a main switch, not shown. The change-over between the up-count mode and the down-count mode of the up-down counter UCD is controlled by the output $T_3$ from the discrimination circuit 17. That is, when the output $T_3$ of the discrimination circuit 17 is low (this means that the peak value voltage Vp held by the peak value hold circuit 13 is in the relation that $Vp \geq V_{MAX}$ with respect to the upper limit voltage $V_{MAX}$ set by the standard voltage setting circuit 15), the up-down counter UCD is set to the up-count mode, and when the discrimination output $T_3$ is high (this means that the aforementioned peak value voltage Vp is in the relation that $Vp > V_{MAX}$ with respect to the voltage $V_{MAX}$), the up-down counter UCD is set to the down-count mode.

$ER_3$ is an exclusive OR gate to which are applied the output of each bit of the up-down counter UCD (Q outputs of the flip-flops $FP_3$–$FP_5$) and the discrimination output $T_3$. The exclusive OR gate $ER_3$ serves as a count limiter which, when the up-down counter UCD has counted down or counted up up to the last bit thereof, namely, when the state shown at $A_0$ or $A_7$ in FIG. 7 has been reached, inhibits any further count, whereby the up-down counter UCD can count the pulses $\phi_{19}$ and $\phi_{22}$ up to a total of 7 pulses and does not count any further. $OR_3$ is an OR gate for taking the logic sum of the outputs $T_3$ and $T_4$ from the discrimination circuit 17, and the output of the OR gate $OR_3$ is imparted to the AND gate $AN_8$ with the output of the exclusive OR gate $ER_3$. Accordingly, whether or not the integration time should be changed on the basis of the state of the outputs $T_3$ and $T_4$ from the discrimination circuit 17 is determined here by the OR gate $OR_3$ and the AND gate $AN_8$, and when the integration time is changed, whether it should be shortened or elongated is determined by the state of the discrimination output $T_3$ (that is, it is elongated in case of up count and shortened in case of down count).

DCD is a decoder for decoding the count output of the up-down counter UCD into information on the integration time. The decoder DCD is adapted to decode the 3-bit binary output of the up-down counter UCD into decimal data. $BP_{11}$–$BP_{18}$ are buffer amplifiers for impedance conversion which respectively receive the outputs $B_1$–$B_8$ of the decoder DCD, and TC is a timer circuit for setting the integration time. The timer circuit TC has eight time constant circuit portions comprising combinations of resistors $R_{31}$–$R_{38}$ and capacitors $C_{11}$–$C_{18}$, and the time constant circuit portions are respectively connected to the output terminals of the buffer amplifiers $BP_{11}$–$BP_{18}$. $Tr_{21}$–$Tr_{28}$ are transistors for controlling the time constant operations of the eight time constant circuit portions. The transistors $Tr_{21}$-$Tr_{28}$ are ON-OFF-controlled by the control signal $\phi_{21}$ (see FIG. 6(*l*)) put out from the sequence control signal generating circuit 20. In the eight time constant circuit portions, a first time constant circuit portion comprising a resistor $R_{31}$ and a capacitor $C_{11}$ has the shortest time constant, and a second, a third, a fourth time constant circuit portion, etc. have longer time constants, and an eighth time constant circuit portion comprising a resistor $R_{38}$ and a capacitor $C_{18}$ has the longest time constant and accordingly, eight different integration times are obtained in accordance with the outputs $B_1$-$B_8$ of the decoder DCD.

From the sequence control signal generating circuit 20, a pulse signal $\phi_{15}$ (see FIG. 6(*m*)) is put out which is utilized as the start pulse $\phi_s$ only during the elimination of unnecessary charge in the sensor device 1, namely, during high-speed read-out of the sensor device output. As will be appreciated from FIGS. 6(*l*) and (*m*), the control signal $\phi_{21}$ is put out in such a manner that it is inverted from high to low in synchronism with the falling of the pulse signal 15 and returned from low to high after a predetermined time.

SPC is a start pulse generating circuit for generating the pulse signal (see FIG. 6(*p*)) for starting the taking-out of the effective scanning output, namely, the low-speed read-out of the sensor device output, with the timing determined by the timer circuit TC. The start pulse generating circuit SPC comprises an OR gate $OR_7$ (whose output is shown in FIG. 6(*n*)) for taking the logic sum of the outputs from the time constant circuit portions in the timer circuit TC, a buffer amplifier for impedance conversion, a delay circuit portion comprising a resistor $R_{39}$ and a capacitor $C_{19}$, a switching transistor $Tr_{29}$ and resistor 40 connected to the delay circuit portion, and an AND gate $AN_9$ for taking the logic product of the output of the transistor $Tr_{29}$ (whose collector potential is shown in FIG. 6(*o*)) and the output of the OR gate $OR_7$. The aforementioned pulse signal is put out through the AND gate $AN_9$, as shown in FIG. 6(*p*).

In FIG. 4, $AN_7$ is an AND gate for taking the logic product of the output of the AND gate $AN_6$ and the output of an OR gate $OR_8$ which takes the logic sum of the outputs $B_1$ and $B_2$ of the decoder DCD in the integration time control circuit 28. The output of the AND gate $AN_7$ is imparted to the base of a transistor $Tr_{17}$ connected to the display light-emitting diode LD through a resistor $R_{28}$ and thus, when the output $B_1$ or $B_2$ of the decoder DCD has become high, namely, when the integration time has been set to an adjustable shortest time or a subsequent next shortest time, one input of the AND gate $AN_7$ becomes high and in this state, when the output of the AND gate $AN_6$ becomes high with the optical system being adjusted within a proper focus range with respect to the object, the output of the AND gate $AN_7$ also becomes high and therefore, in this case, the resistors $R_{27}$ and $R_{28}$ are parallel-connected to the light-emitting diode LD so that the flowing current is increased as compared with the case where only the resistor $R_{27}$ is so connected and thus, the quantity of light emitted by the diode LD is increased. That is, it means a very high ambient brightness that the integration time has been set to the shortest time or the next shortest time and in such a situation, if a camera or the like is designed such that the turn-on of the light-emitting diode LD can be visually recognized within the finder thereof, the focus display by the light-emitting diode LD becomes very difficult to see under the influence of the ambient brightness and accordingly, if the above-described construction is added, the quantity of light emitted by the light-emitting diode LD is increased during the focus display in case of a very high ambient brightness, thus effectively eliminating the above-described inconvenience.

Also, in FIG. 4, reference character $OR_9$ designates, an OR gate for taking the logic sum of the pulse signal $\phi_{15}$ put out from the sequence control signal generating circuit 20 and the output pulse from the start pulse generating circuit SPC in the integration time control circuit 28, and here, the output of the OR gate $OR_9$ is imparted to the sensor device 1 as the start pulse $\phi_s$.

Reference is now had to FIGS. 6 and 7 to describe the operation of the FIG. 4 circuit system. When the main switch, not shown, is closed at the time $t_o$, as already noted, the voltage $V_E$ is imparted to the sensor device 1 and the differential amplifier circuit 8 in the circuit system shown in FIGS. 3A and 3B and the voltage $V'_E$ is imparted to the other circuit portion. The voltage $V_E$ is also imparted to the start pulse generating circuit SPC in the integration time control circuit 28 shown in FIG. 5 and the voltage $V'_E$ is imparted to the other circuit portion and at this time, the sequence control signal generating circuit 20, in response to the closing of the main switch, puts out a clear pulse $\phi_{20}$ to the integration time control circuit 28 as shown in FIG. 6(*i*), whereby in the integration time control circuit 28 the flip-flops $FP_3$-$FP_5$ in the up-down counter UDC are cleared and the Q outputs thereof all become low (see the state indicated by $A_O$ in FIG. 7). On the other hand, at this point of time, the capacitor $C_4$ in the peak value hold circuit 13 shown in FIG. 3 is not being charged so that apparently $V_P < V_{MIN}$ and therefore, the output $T_3$ of the discrimination circuit 17 is low while the output $T_4$ thereof is high, whereby in the integration time control circuit 28 the up-down counter UDC is first set to the up-count mode. Also, at this time, the sequence control signal generating circuit 20 renders the control signal $\phi_{21}$ to the integration time control circuit 28 high as shown in FIG. 6(*l*), whereby in the integration time control circuit 28 the transistors $Tr_{21}$-$Tr_{28}$ in the timer circuit TC are rendered conductive to clear the charges in the capacitors $C_{11}$-$C_{18}$.

Next, immediately after the clear pulse $\phi_{20}$ is put out, the sequence control signal generating circuit 20 puts out, for example, four pulses $\phi_{19}$ for the integration time initial setting, as shown in FIG. 6(*j*), to the integration time control circuit 28, whereby the up-down counter UDC counts up four and the output thereof becomes "001" as indicated by state $A_4$ in FIG. 7 (that is, only the Q output of the flip-flop $FP_5$ is high and the others are low), and the decoder DCD decodes this binary output "001" into a decimal data so that the output $B_5$ thereof becomes high.

When the time $t_1$ is reached, the sequence control circuit 20 puts out a pulse signal $\phi_{15}$ as shown in FIG. 6(*m*) and this is imparted as the start pulse $\phi_s$ to the sensor device 1 through the OR gate $OR_9$. Also, at this time, the sequence control signal generating circuit 20 puts out a high-speed read-out instructing signal as the instruction signal $\phi_A$ to the driver circuit 21, whereby the driver circuit 21, puts out clock pulses of relatively high frequency as the transfer clocks $\phi_1$-$\phi_4$ and reset pulse $\phi_R$ and thereby, as already noted, an unnecessary signal is put out from the sensor device 1 during from the time $t_2$ to the time $t_3$. Although not mentioned in connection with FIGS. 3A and 3B, such unnecessary signal is subjected to noise component elimination by the differential amplifier circuits 8, 10 and filter circuit 11 in the circuit system of FIG. 3A and finally in the binary circuit 16 of FIG. 3B, it is subjected to the binary transformation process with the voltages $V_S$ and $V_F$ as the slice level and is put out as the binary data $T_1$, $T_2$; at this time, the output of the discrimination circuit 17 is high and therefore, the output $T_2$, namely, the data binary-transformed by the voltage $V_F$, is selected by the data selecting circuit 18 and this data is imparted to the data distributing circuit 23 and the slice failure detection circuit 27, but at this time, the sequence control signal generating circuit 20 holds the data distributing circuit 23 in inoperative state (namely, gate-off condition) by the control signal $\phi_D$ and cuts off the drive locks $\phi_{11}$–$\phi_{13}$ to the shift registers $SR_1$, $SR_2$ and $SR_3$ and accordingly, the take-in of this output data $T_2$ does not take place at all and as will be appreciated from FIG. 6(r), the input control signal $\phi_{16}$ to the slice failure detection circuit 27 is made low and thus, the detection as to the presence of the failure in the data processing regarding the standard field image is neither effected by the slice failure detection circuit 27. Also, during this time, the sequence control signal generating circuit 20, as will be appreciated from FIGS. 6(c)–(h), holds in inoperative state the dark current signal detection and hold circuit 9, the peak value detection circuit 12 and the peak value hold circuit 13 by control signals $\phi_5$–$\phi_{10}$ and therefore, at this time, the detection and hold of the dark current signal and detection and hold of the peak value by these circuits 9, 12 and 13 do not take place.

On the other hand, the sequence control signal generating circuit 20, when putting out the pulse signal $\phi_{15}$, inverts the control signal $\phi_{21}$ to the integration time control circuit 28 from high to low in synchronism with the falling of the pulse signal $\phi_{15}$, as shown in FIG. 6(l), whereby in the integration time control circuit 28, the transistors $Tr_{21}$–$Tr_{28}$ in the timer circuit TC thereof are all rendered non-conductive. At this time, only the output $B_5$ of the decoder DCD is high as mentioned above, and therefore the fifth time constant circuit portion comprising a resistor $R_{35}$ and a capacitor $C_{15}$ starts its time constant operation by the output of the buffer amplifier $BP_{15}$ and when the capacitor $C_{15}$ comes to be completely charged, for example, at the time $t_4$, the output of the OR gate $OR_7$ is inverted from low to high at this time $t_4$ as shown in FIG. 6(n) and then, when a predetermined delay time set by a delay circuit comprising a resistor $R_{39}$ and a capacitor $C_{19}$ elapses from this point of time, the transistor $Tr_{29}$ becomes non-conductive and the collector potential thereof is inverted from high to low as shown in FIG. 6(o), and after all, the output of the AND gate $AN_9$ which takes the logic product of the output of the OR gate $OR_7$ and the output of the transistor $Tr_{29}$ becomes a pulse signal generated at the timing (in this case, the time $t_4$) determined by the fourth time constant circuit portion in the timer circuit TC, as shown in FIG. 6(R) and this is imparted as the start pulse $\phi_S$ to the sensor device 1 through the OR gate $OR_9$. (That is, the integration time $T_i$ (see FIG. 6(b)) described in connection with FIGS. 3A and 3B is thus obtained as a time from the point of time whereat the pulse signal $\phi_{15}$ from the sequence control signal generating circuit 20 falls to the falling of the output of the OR gate $OR_7$ determined by the timer circuit TC.)

When a pulse signal is put out from the AND gate $AN_9$, the sequence control signal generating circuit 20 imparts, in response thereto, a clear signal $\phi_{17}$ to the slice failure detection circuit 27, as shown in FIG. 6(q), to clear the flip-flops $FP_1$ and $FP_2$ and imparts a low-speed read-out instructing signal as the instruction signal $\phi_A$ to the driver circuit 21, whereby clock pulses of relatively low frequency are now put out as the transfer clocks $\phi_1$–$\phi_4$ and reset pulse $\phi_R$ from the driver circuit 21 to effect low-speed read-out of the sensor device output as described above. As noted above, this read-out is terminated, for example, during from the time $t_5$ to the time $t_{13}$, and the sequence control signal generating circuit 20 first makes high the control signal $\phi_6$ to the dark current signal detection and hold circuit 9 during from the time $t_5$ to the time $t_6$, as shown in FIG. 6(d), whereafter it makes the control signal $\phi_5$ low during from the time $t_6$ to the time $t_7$, as shown in FIG. 6(c), thereby effecting the detection and hold of the dark current signal; the sequence control signal generating circuit 20 also makes high the control signal $\phi_8$ to the peak value detection circuit 12 during from the time $t_5$ to the time $t_9$ as shown in FIG. 6(f), whereafter it makes the control signal $\phi_7$ low during from the time $t_9$ to the time $t_{10}$ as shown in FIG. 6(e), thereby effecting the detection of the peak value of the scanning output regarding the standard field image as described above while, on the other hand, at the time $t_9$, it inverts the control signal to the integration time control circuit 28 from low to high as shown in FIG. 6(l), thereby rendering conductive the transistors $Tr_{21}$–$Tr_{28}$ in the timer circuit TC to reset the timer circuit TC (by this, the charge in the capacitor $C_5$ is cleared so that the output of the OR gate $OR_7$ is inverted to low as shown in FIG. 6(n)), and further, during from the time $t_9$ to the time $t_{10}$, the control signal $\phi_D$ instructs the data distributing circuit 23 to impart the output data from the data selecting circuit 18 to the shift regisiter $SR_1$ (since, at this time, the output $T_4$ of the discrimination circuit 17 is still high, the data put out from the data selecting circuit 18 is the output of the second comparator $CP_5$ in the binary circuit 16, namely, the data $T_2$ transformed into a binary form by the voltage $V_F$) while, at this time, a drive clock $\phi_{11}$ is imparted to the shift register $SR_1$ and also during this time $t_9$ to the time $t_{10}$, the control signal $\phi_{16}$ to the slice failure detection circuit 27 is made high as shown in FIG. 6(r). By this, the binary data regarding the standard field image obtained during from the time $t_9$ to the time $t_{10}$ are successively stored in the shift register $SR_1$ while, at this time, the slice failure detection circuit 27 detects whether or not both the signals of "1" and "0" are included in such binary data. That is, when the binary data are all "1" as "0" (this means "slice failure" and in this case, accurate distance detection is impossible), the output of only one of the AND gate $AN_3$ or $AN_4$ becomes high but the other remains low until the time $t_{10}$ is reached, so that the Q output of only one of the flip-flop $FP_1$ or $FP_2$ becomes high and therefore, one input of the NAND gate $AN_5$ remains low so that the output $\phi_{18}$ thereof remains high even at the point of time whereat the time $t_{10}$ is reached while, on the other hand, if both the signals of "1" and "0" are included in the aforementioned binary data, the outputs of the AND gates $AN_3$ and $AN_4$ surely once become high at any timing by the time the time $t_{10}$ is reached and therefore, at that point of time, the flip-flops $FR_1$ and $FR_2$ are triggered so that the Q outputs thereof become high and accordingly, both inputs of the NAND gate AN$_5$ become high and the output $\phi_{18}$ thereof has become low at the point of time whereat the time $t_{10}$ has been reached; after all, in this manner, a high signal is put out in the case of "slice failure" and a low signal is put out when the slice (binary transformation process) has been properly effected. When the time $t_{10}$ is reached, the sequence control signal generating circuit 20 operates as follows on the basis of the state of the output $\phi_{18}$ of the slice failure detection circuit 27 at this point of time, namely, on the basis of whether the output $\phi_{18}$ is high or low. That is, when the output $\phi_{18}$ is high, as shown at (A) in FIG. 6, the sequence control signal generating circuit 20 does not effect the operation described below but immediately puts out the control signal $\phi_{15}$ to cause the sequence to shift to a first sequence which starts from the time $t_{17}$, namely, a new sequence which starts from the above-mentioned elimination of the unnecessary charge in the sensor device 1 (by this, the time loss resulting from the failure in the binary transformation process of the image scanning output may be minimized); on the other hand, when the output $\phi_{18}$ is low, the sequence control signal generating circuit 20 continuedly effects the following operation.

When the time $t_{10}$ is reached and the storing into the shift register SF$_1$ of the binary data regarding the standard field image is terminated, the sequence control signal generating circuit 20 cuts off the drive clock $\phi_{11}$ to the shift register SR$_1$ and further, when the time $t_{11}$ is reached, the control signal $\phi_D$ instructs the data distributing circuit 23 to impart the output data (T$_2$) of the data selecting circuit 18 now to the shift registers SR$_2$ and SR$_3$ during from this time point to the time $t_{12}$ and the drive clocks $\phi_{12}$ and $\phi_{13}$ are imparted to the shift registers SR$_2$ and SR$_3$, respectively, whereby the binary data regarding the reference field image obtained from the time $t_{11}$ to the time $t_{12}$ are successively stored in the shift registers SR$_2$ and SR$_3$. When the time $t_{12}$ is reached, the sequence control signal generating circuit 20 sets the data distributing circuit 23 to the gate-off condition by the control signal $\phi_D$ and cuts off the drive clocks $\phi_{12}$ and $\phi_{13}$ to the shift registers SR$_2$ and SR$_3$. After the read-out has been terminated and when the time $t_{14}$ is reached, the sequence control signal generating circuit 20 makes high the control signal $\phi_{10}$ to the peak value hold circuit 13 during from the time $t_{14}$ to the time $t_{15}$, as shown in FIG. 6(h), whereafter it makes the control signal $\phi_9$ low during from the time $t_{15}$ to the time $t_{16}$, as shown in FIG. 6(g), thereby effecting the holding of the peak value detected by the peak value detection circuit 12. When the holding of the peak value Vp is effected by the peak value hold circuit 13, the slice level Vs for binary transformation of the image scanning output obtained during the next cycle of read-out of the effective scanning output is determined by the voltage dividing circuit 14 on the basis of the peak value Vp and at the same time, whether or not the peak value Vp is within the voltage range determined by the voltages V$_{MAX}$ and V$_{MIN}$ is detected by the discrimination circuit 17. If V$_{MAX}$≧Vp≧V$_{MIN}$ at this time, both the outputs T$_3$ and T$_4$ of the discrimination circuit 17 become low, whereby the data selecting circuit 18 is set so as to select the data put out from the first comparator CP$_4$, namely, the data T$_1$ binary-transformed by the slice level Vs, from among the two different data T$_1$ and T$_2$ from the binary circuit 16. On the other hand, if Vp>V$_{MAX}$ or Vp>V$_{MIN}$, one of the outputs T$_3$ and T$_4$ of the discrimination circuit 17 becomes high so that the data selecting circuit is set so as to select the data T$_2$ binary-transformed by the slice level V$_F$ in the same manner as that described above. In the integration time control circuit 28, when Vp≦V$_{MAX}$, the output T$_3$ of the discrimination circuit 17 is low so that the up-down counter UDC remains set to the up-count mode as already described while, if V$_F$>V$_{MAX}$, the discrimination output T$_3$ becomes high and accordingly, the up-down counter UDC becomes set to the down-count mode.

Now, when the time $t_{16}$ is reached, the binary data regarding the standard field image and the binary data regarding the reference field image are respectively stored in the shift registers SR$_1$, SR$_2$ and SR$_3$. Here, when the time $t_{16}$ is reached, the sequence control signal generating circuit 20 sets the counter for counting the number of coincidences in the maximum coincidence number detection circuit 24 to the operative condition by the control signal $\phi_B$ and also sets the counter for counting the data shift amount in the data shift amount detection circuit 25 to the operative condition by the control signal $\phi_c$, and while cutting off the drive clock $\phi_{13}$ to the shift registor SR$_3$, it imparts the drive clocks $\phi_{11}$ and $\phi_{12}$ to the shift registers SR$_1$ and SR$_2$ by an amount corresponding to the bit number of the shift registers SR$_1$ and SR$_2$ (the drive clocks $\phi_{11}$ and $\phi_{12}$ in this case are identical to each other). By this, in the shift registers SR$_1$ and SR$_2$, the data stored in each bit thereof are successively circulatingly shifted in synchronism and the coincidence or non-coincidence between the data of each bit is detected by the exclusive NOR gate EN, and the number of coincident data at this time is counted by the counter in the maximum coincidence number detection circuit 24. When one circulating shift of the data is terminated, the sequence control signal generating circuit 20 cuts off the drive clocks $\phi_{11}$ and $\phi_{12}$ to the shift registers SR$_1$ and SR$_2$ and operates the aforementioned comparator in the maximum coincidence number detection circuit 24 by the control signal $\phi_B$, whereby said comparator compares the content of the aforementioned counter with the content of the aforementioned register in the circuit 24 (this latter content is "0" at this point of time) and if the content of the counter is greater than the content of the register, it imparts a load signal $\phi_L$ to the said register to cause the then content of the counter to be taken into the register (of course, if "the content of the counter"≦"the content of the register" at this time, the comparator will not put out the load signal $\phi_L$ and accordingly, the content of the register will not be rewritten). The load signal $\phi_L$ from the comparator is also imparted to the register in the data shift amount detection circuit 25 but at this point of time, the counter in the circuit 25 is only set to the operative condition and is not at all imparted the count pulse and therefore, the content thereof is zero and thus, the content which the register takes in is "0".

When the above-described operation is terminated, the sequence control signal generating circuit 20 imparts drive clocks $\phi_{12}$ and $\phi_{13}$ to the shift registers SR$_2$ and SR$_3$ in synchronism while cutting off the drive clock $\phi_{11}$ imparted to the shift register SR$_1$, whereby in the shift registers SR$_2$ and SR$_3$ the contents thereof are shifted to the right by one bit so that the data stored in the rightmost bit of the shift register SR$_3$ is taken into the leftmost bit of the shift register SR$_2$ (of course, the then stored data in the rightmost bit of the shift register SR$_2$ is dropped). During such operation, the sequence control signal generating circuit 20 clears the counter in the maximum coincidence number detection circuit 24 by the control signal $\phi_B$ and at the same time, imparts a count-up pulse as the control signal $\phi_C$ to the counter in the data shift amount detection circuit 25, whereby the counter in the circuit 25 counts up one.

When this is terminated, the sequence control signal generating circuit 20 again imparts the drive clocks $\phi_{11}$ and $\phi_{12}$ to the shift registers $SR_1$ and $SR_2$ in synchronism by the amount corresponding to the bit number thereof, whereby the contents of the shift registers $SR_1$ and $SR_2$ are again caused to effect one circulation and at this time, the number of coincidences between the data thereof is newly counted by the counter in the maximum coincidence number detection circuit 24 in the same manner as described above. When one circulation of this data is terminated, the sequence control signal generating circuit 20 operates the comparator in the maximum coincidence number detection circuit 24 by the control signal $\phi_B$ to cause this comparator to compare the magnitude of the then content of the counter with that of the then content of the register and if "the content of the counter">"the content of the register", a load signal $\phi_L$ is put out from this comparator so that the content of the register is rewritten into the content of the counter and at this time, in the data shift amount detection circuit 25, the content of the register in the circuit 25 is rewritten into the content of the counter in the circuit 25 (which is "1" at this time).

Thereafter, the data initially stored at the leftmost bit of the shift register $SR_3$ is taken into the leftmost bit of the shift register $SR_2$, whereafter the data in the shift registers $SR_1$ and $SR_2$ are again caused to make one circulation and the above-described circulation and comparison is repeated until the comparison and detection thereof is terminated. It will be apparent that at the point of time at which the circulation and comparison is terminated, the data stored in the register in the maximum coincidence number detection circuit 24 and the register in the data shift amount detection circuit 25 are the maximum value of the number of coincidences between the data in the shift registers $SR_1$ and $SR_2$ obtained through the above-described circulation and comparison and the shift amount of the data in the shift registers $SR_2$ and $SR_3$ required for the number of coincidences between these data to become maximum (or in other words, the information on the position occupied in the reference field image by the image portion of the reference field image which can be regarded as being coincident or most similar to the standard field image— such information corresponds to the distance to the target object as already noted).

When all the described circulation and comparison is terminated, the sequence control signal generating circuit 20 finally clears the contents of the counter and register in the maximum coincidence number detecting circuit 24 by the control signal $\phi_B$ and clears the content of the counter in the data shift amount detection circuit 25 by the control signal $\phi_C$ while, at the same time, it operates the D/A converter circuit 26, whereby the D/A converter circuit 26 converts the digital data stored in the register in the data shift amount detection circuit 25 into an analog signal representative of the information on the distance to the target object and puts out such analog signal, which in turn is imparted to the meter Me and the comparators $CP_8$ and $CP_9$ through the buffer amplifier $BP_4$.

Thereafter, when the time $t_{17}$ is reached, pulse signal $\phi_{15}$ is again put out from the sequence control signal generating circuit 20 as shown in FIG. 6(m) to start a new sequence which begins with the elimination of unnecessary charge in the sensor device 1 and effect the same processing operation as that described above and this is repeated as long as the unshown main switch is closed, and in the meantime the distance to the target object is indicated by the meter Me. At the point of time at which the object distance comes to be indicated by the meter Me, if the unshown optical system is adjusted with the object distance indicated by the meter Me being as the standard, the outputs of the comparators $CP_8$ and $CP_9$ both become high at a point of time at which the optical system is properly adjusted within a proper focus range with respect to the target object as fully described previously, whereby the output of the AND gate $AN_6$ becomes high and the transistor $Tr_{16}$ conducts to thereby turn on the light-emitting diode LD, which thus indicates that the optical system has been adjusted within a proper focus range.

The above-described sequence control signal generating circuit 20 puts out an integration time changing pulse signal $\phi_{22}$ to the integration time control circuit 28 as shown in FIG. 6(k) after the circulation and comparison of the binary image data is generally terminated but slightly before the next new sequence which begins with the elimination of the unnecessary charge in the sensor device 1 (namely, the sequence which begins with the time $t_{17}$ and the time $t_{33}$) is entered, and such pulse signal $\phi_{22}$ is imparted to the AND gate $AN_8$ in the integration time control circuit 28; the AND gate $AN_8$ imparts the pulse signal $\phi_{22}$ to the up-down counter UDC only when both the outputs of the exclusive OR gate $ER_3$ and the OR gate $OR_3$ are high, namely, when the up-down counter UDC is in one of the states indicated by $A_1$–$A_6$ in FIG. 7 and one of the outputs $T_3$ and $T_4$ of the discrimination circuit 17 is high (namely, in the state of $Vp > V_{MAX}$ or $Vp < V_{MIN}$). Assuming that the AND gate $AN_8$ has put out the pulse signal $\phi_{22}$, the up-down counter UDC, if set to the up-count mode by the state of the discrimination output $T_3$, counts up one in response to the pulse signal $\phi_{22}$ and that state shifts by one toward the state indicated by $A_7$ in FIG. 7, whereby the position of the high output of the decoder DCD shifts by one toward the output $B_8$, so that in the timer circuit TC the selected time constant circuit portion shifts by one toward the eighth time constant circuit portion comprising a resistor $R_{38}$ and a capacitor $C_{18}$ and thus, a time constant circuit portion having a longer time constant than before is selected and after all, the integration time is set to a longer time than before. Conversely, if the up-down counter UDC is set to the down-count mode, it counts down one in response to the pulse signal $\phi_{22}$ and that state shifts by one toward the state indicated by $A_0$ in FIG. 7, whereby the position of the high output of the decoder DCD shifts by one toward the output $B_1$, so that the selected time constant circuit portion shifts by one toward the first time constant circuit portion comprising a resistor $R_{31}$ and a capacitor $C_{11}$ and thus, a time constant circuit portion having a shorter time constant than before is selected and after all, the integration time is set to a shorter time than before.

Such a change of the integration time means that the peak value is in the state of $Vp > V_{MAX}$ or $Vp < V_{MIN}$ (namely, one of the outputs $T_3$ and $T_4$ of the discrimination circuit 17 is high) as already mentioned, and therefore, in selecting the binary image data $T_1$ and $T_2$ from the binary circuit 16 obtained with the integration time changed, the data $T_2$ binary-transformed with the voltage $V_F$ set by the standard voltage setting circuit 15 being as the slice level is selected by the data selecting circuit 18 and the described distance detection is carried out on the basis of this data $T_2$ and after all, even with the integration time changed, effective binary image data may be obtained and the distance detection may be properly performed on the basis of such data, thus well avoiding the waste of the improper scanning output which would otherwise result from the change of the integration time. That is, when the integration time is changed, the image scanning output obtained next is one whose level has been adjusted so as to be within a proper level range while, on the other hand, the voltage Vs as the slice level set by the voltage dividing circuit 14 at this time is set on the basis of the peak value Vp of the previous image scanning output which has been obtained before the change of the integration time and whose level deviates from the proper level range and therefore, the data $T_1$ binary-transformed with the voltage vs as the slice level is apparently improper. In contrast, the data $T_2$ obtained by binary-transforming the described image scanning output with the voltage $V_F$ set by the standard voltage setting circuit 15 being as the slice level is much more proper as a data than at least the above-mentioned data $T_1$ and accordingly the subsequent distance detection can be properly carried out by this data $T_2$, thus avoiding the waste and time loss of the improper scanning output which would otherwise result from the change of the integration time.

In changing the integration time, when the up-down counter UDC assumes the state indicated by $A_0$ or $A_1$ in FIG. 7 and one of the output $B_1$ or $B_2$ of the decoder DCD become high (this means that the integration time has been set to a very short time), the output of the OR gate $OR_8$ becomes high so that one input of the AND gate $AN_9$ becomes high and accordingly, as fully described already, in the focus display by the light-emitting diode LD in this state, an inconvenience that the quantity of light emitted from the diode LD is increased to make the display difficult to see under the influence of the ambient brightness may be avoided.

According to the circuit system shown in FIG. 4, distance detection based on the binary image data $T_1$ or $T_2$ and change of the integration time based on the discrimination information $T_3$, $T_4$ of the peak value Vp are effected in the manner described above.

Incidentally, in the construction described above, it is apparently more advantageous to make such a design that particularly during the first cycle of the image scanning, the output data $T_2$ of the output data $T_1$ and $T_2$ from the binary circuit 16 is surely selected by the data selecting circuit 18 shown in FIG. 4, and for this purpose, the clear pulse $\phi_{20}$ (see FIG. 6(i)) imparted from the sequence control circuit 20 to the integration time control circuit 28 during the closing of the main switch may be adapted to be imparted to the base of the stored value clearing transistor $Tr_{15}$ in the peak value hold circuit 13 of FIG. 3B with the control signal $\phi_{10}$ (for example, through the OR gate), as shown by the signal line Ⓑ indicated by broken line in FIG. 4. Thus, according to this, during the first cycle of image scanning, the output Vp of the peak value hold circuit 13 is surely at zero level so that the output $T_4$ of the discrimination circuit 17 surely becomes high, whereby in the data selecting circuit 18, the output data $T_2$ of the output data $T_1$ and $T_2$ of the binary circuit 16 is surely selected.

As already described in connection with FIG. 1, the sensor device 1 has a part of the light receiving portion 2 thereof shielded from light by the light-intercepting layer 6 and in reading out the sensor device output, a part of the signal corresponding to the output from the light receiving element 2' shielded from light is detected and held as a dark current signal in the dark current signal detection and hold circuit 9 shown in FIG. 3A, whereby the output subsequently read out is subjected to the dark current component eliminating process in the differential amplifier circuit 10 and here, for example, when the intensity of the incident light on the light receiving portion 2 is sharply and extremely increased in the state that integration of the image signal is taking place under a relatively long integration time, the intensity of the leakage light entering into the light-shielded light receiving element 2' from the end face of the light-intercepting layer 6 for the light receiving element 2' which is adjacent to the light receiving element 2'' which is not shielded from light is increased to extremely increase the quantity of stored charge in the light-shielded element 2' and accordingly, in the read-out of the sensor divice output, the level of the dark current signal component detected and held by the dark current signal detection and hold circuit 9 is extremely increased so that the signal level of the subsequently read-out output after the dark current component elimination by the differential amplifier circuit 10 becomes very low to thereby decrease the peak level of the signal component corresponding to the standard field image detected by the peak detection circuit 12, so that the output $T_3$ from the comparator $CP_6$ in the discrimination circuit 17 of FIG. 3B becomes low and accordingly, the up-down counter UDC of FIG. 5 effects up-count and while the integration time for the sensor device 1 must originally be changed to the short time side, it is conversely changed to the long time side, thus giving rise to a fear that the situation becomes further unfavorable.

Figure 8A:
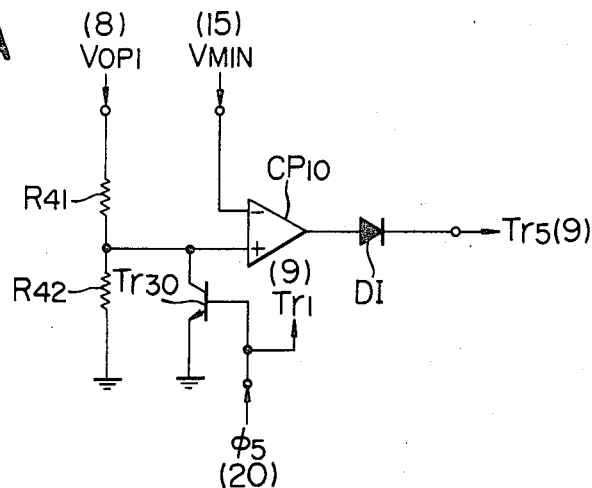
FIG. 8(a), (b) and (c) are partial circuit diagrams showing three improved examples of the circuit system of FIG. 3A or a combination thereof with the integration time control circuit shown in FIG. 5.

To prevent such a situation, as shown, for example, in FIG. 8(a), a circuit comprising a comparator $CP_{10}$ whose non-inverting input terminal is adapted to receive the divided voltage value of the output $V_{OP1}$ of the differential amplifier circuit 8 of FIG. 3A divided by resistors $R_{41}$ and $R_{42}$ and whose inverting input terminal is adapted to receive the lower limit voltage $V_{MIN}$ set by the standard voltage setting circuit 15 of FIG. 3B and an npn transistor $Tr_{30}$ similar to the transistor $Tr_1$ in the dark current signal detection and hold circuit 9 whose base is imparted the control signal $\phi_5$ (FIG. 6(c)) from the sequence control signal generating circuit 20 to thereby limit the input to the comparator $CP_{10}$ only to a part of the signal corresponding to the output from the light-shielded light receiving element 2' may be added to the dark current signal detection and hold circuit 9 so that the output of the comparator $CP_{10}$ may be imparted through a diode DI to the base of the stored value clearing transistor $Tr_5$ in the dark current signal detection and hold circuit 9. According to such a connection and construction, during the read-out of the sensor device output, when the level of the signal component corresponding to the output from the light-shielded light receiving element 2', namely, the dark current signal component, is increased and the divided voltage level by the resistors $R_{41}$ and $R_{42}$ is over the lower limit voltage $V_{MIN}$, the output of the comparator $CP_{10}$ changes from low to high so that the stored value clearing transistor $Tr_5$ in the dark current signal detection and hold circuit 9 is turned on to clear the stored value in the dark current signal storing capacitor $C_1$ and accordingly, the dark current component elimination process for the subsequently read-out output by the differential amplifier 10 becomes hardly effected and so, the level of this output is increased, whereby the peak value of the signal component corresponding to the standard field image detected by the peak value detection circuit 12 becomes over the upper limit voltage $V_{MAX}$ set by the standard voltage setting circuit 15, so that the integration time for the sensor device 1 is changed over to the short time, thus preventing occurrence of the above-described situation.

Figure 8B:
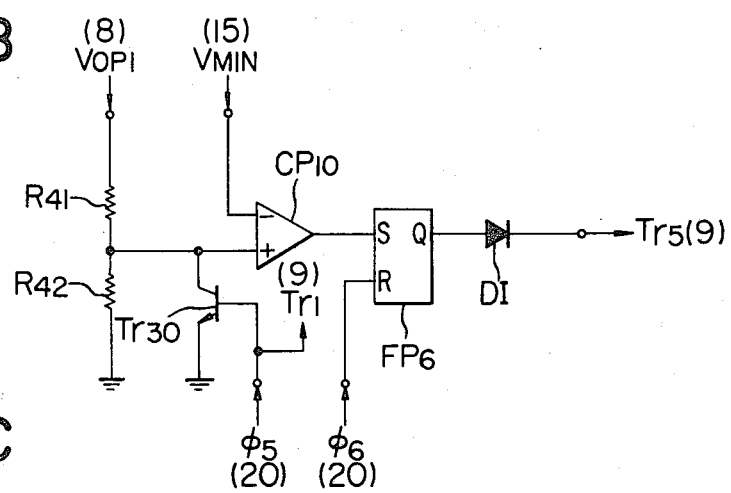

Incidentally, in the construction shown in FIG. 8(a), during the read-out of the sensor device output, as long as the divided voltage level of the dark current signal component corresponding to the output from the light-shielded light receiving element 2', divided by the resistors $R_{41}$ and $R_{42}$, is over the lower limit voltage $V_{MIN}$, the transistor $Tr_5$ is turned on by the output of the comparator $CP_{10}$ so that the stored value in the capacitor $C_1$ continues to be cleared and when the level of the dark current signal component is decreased in the course and the divided voltage level thereof by the resistors $R_{41}$ and $R_{42}$ is below the lower limit voltage $V_{MIN}$, then the output of the comparator $CP_{10}$ becomes low to turn on the transistor $Tr_5$ and permit the capacitor $C_1$ to be charged and therefore, in some cases, the subsequently read-out output is subjected, if slightly, to the process of dark current component elimination while on the other hand, such design may also be made that when the output of the comparator $CP_{10}$ once becomes high during the read-out of the sensor device output, the clearing of the capacitor $C_1$ continues so that the dark current component eliminating process for the subsequently read-out output can not take place at all. For this purpose, as shown, for example, in FIG. 8(b), the output of the comparator $CP_{10}$ may be imparted to the set terminal S of a rising synchronous type R-S flip-flop $FP_6$ whose reset terminal R is adapted to receive the control signal $\phi_6$ (see FIG. 6(d)) from the sequence control signal generating circuit 20, whereby the Q output of the flip-flop $FP_6$ may be imparted to the base of the transistor $Tr_5$ through the diode DI.

Figure 8C:
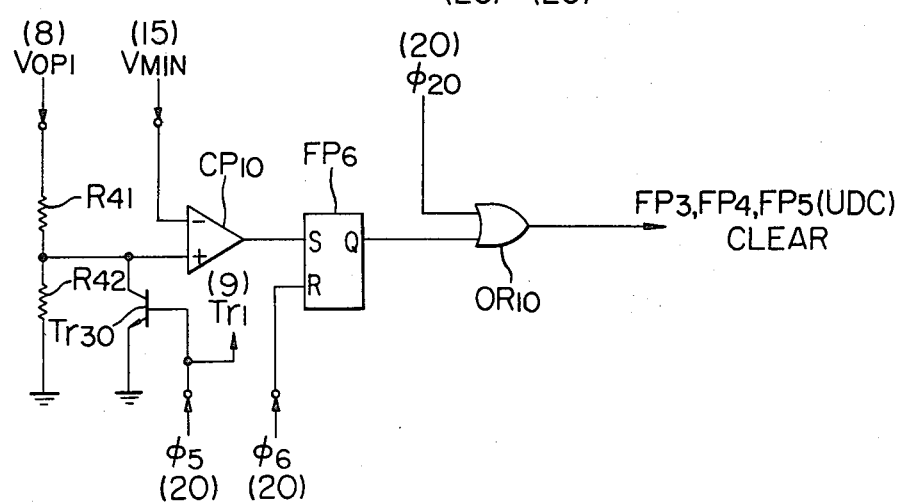

The above-described two examples aim at the effect that the dark current component eliminating process for the sensor device output is substantially nullified to increase the level of the image signal and thereby change the integration time to the short time side, whereas instead of adopting such a method of increasing the image signal level, the high output of the comparator $CP_{10}$ may be utilized to forcibly set the integration time to the shortest time. For that purpose, as shown, for example, in FIG. 8(c), an OR gate $OR_{10}$ may be provided for taking the logic sum of the output of the flip-flop $FP_6$ and the clear pulse $\phi_{20}$ from the sequence control signal generating circuit 20 and the output of the OR gate $OR_{10}$ may be imparted to the clear terminals CLR of the flip-flops $FP_3$, $FP_4$ and $FP_5$ in the up-down counter UDC shown in FIG. 5. According to such a construction, when the output of the comparator $CP_{10}$ changes from low to high, the flip-flop $FP_6$ is set thereby and the Q output thereof changes from low to high, so that the output of the OR gate $R_{10}$ becomes high and accordingly, the flip-flops $FP_3$–$FP_5$ are cleared and the Q outputs thereof all become low so that the state indicated by $A_o$ in FIG. 7 is assumed, and in the decoder DCD the output $B_1$ thereof becomes high and thus, the integration time is set to the shortest time.

In the above-described embodiment, the sequence control signal generating circuit 20 in the circuit system shown, for example, in FIG. 4 may be constructed by reforming the circuit in accordance with the foregoing detailed description such that the control signals $\phi_5$–$\phi_{10}$ to the analog circuit system shown in FIGS. 3A and 3B, the control signals $\phi_{19}$–$\phi_{22}$ to the integration time control circuit 28 shown in FIG. 4, the pulse signal $\phi_{15}$ to the OR gate $OR_9$ and the control signal $\phi_A$ to the driver circuit 21 are obtained at the timing as shown in FIG. 6 or at the timing as mentioned in the description of the embodiment, for the mode control counter 52, the mode counter controller 54, the sequence counter 126, the counter controller 136, the sequence decoder 128, the data take-in controller 130, the data process controller 132 and the data output controller 134 in the circuit system shown particularly in FIG. 11 of our U.S. Patent Application Ser. No. 944,974, filed Sept. 22, 1978, entitled "RANGE FINDING DEVICE" (German Application No. P28 42 348.5, filed Sept. 28, 1978, entitled "Entferungsme-Bvorrichtung") (details of the above-mentioned mode counter controller 54 to the data output controller are shown in FIGS. 20A–20C of this prior application). As regards the driver circuit 21, for example, two frequency dividing counters for frequency-dividing the clock pulse CLK from the basic clock generating circuit 19 into two different pulses, namely, a pulse of relatively high frequency and a pulse of relatively low frequency, and a select gate for selecting the output pulses from these counters in accordance with the control signal $\phi_A$ from the sequence control signal generating circuit 20 may be added to the well-known construction so that the well-known transfer clocks $\phi_1$–$\phi_4$ and reset pulse $\phi_R$ for the sensor device 1 may be put out in accordance with the clock pulse put out from this select gate.

According to the image scanning device of the present invention, as has been described in detail, even in the first cycle of image scanning and even in the image scanning after the change of the integration time of the sensor device has been effected, the image scanning output obtained in such state is not nullified but is properly transformed into a binary form so as to ensure accurate binary image data to be obtained wastelessly, thus well avoiding the waste and time loss of read-out of the output which would otherwise result from the first cycle of image scanning or the change of the integration time; accordingly, as shown in FIG. 4, if the electronic automatic range finding device proposed in the aforementioned U.S. Pat. No. 4,004,852 is adopted, there may be obtained a great advantage that the distance detection can be accomplished accurately and reliably in a shortest time even under the situation wherein the change of the integration time is frequently effected.

Figure 2:
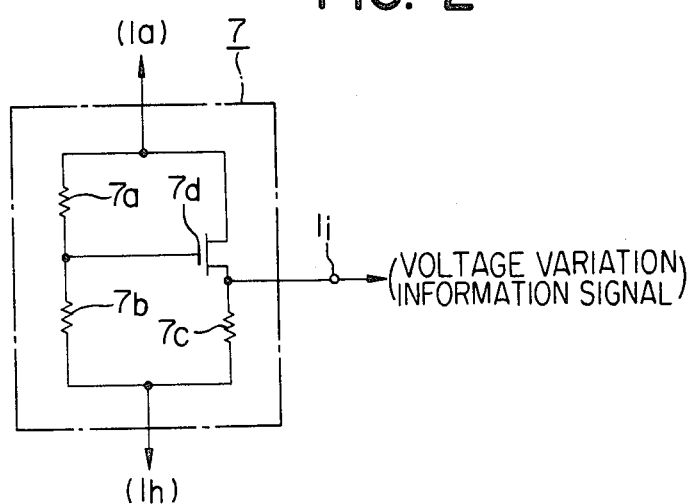
FIG. 2 is a circuit diagram showing, in the form of an equivalent circuit, the construction of a voltage variation detecting portion in the photosensor array device shown in FIG. 1.

In the illustrated embodiment, a photosensor array device somewhat reformed as compared with the device of the prior art has been shown as an example in FIGS. 1 and 2, but it is to be understood that the photosensor array device applicable to the present invention is not restricted to such a construction. However, if such a construction is adopted as the photosensor array device, the dark current component and the voltage variation component in the image scanning output may be well eliminated as already described in connection with the embodiment, and this is further effective to obtain binary image data with a higher accuracy.

We claim:

1. An image scanning system comprising:
   (A) image scanning means arranged to receive an image for providing scanned image signal of the image;
   (B) means for providing a first quantization standard which is variable in accordance with the change in a specific level of said scanned image signal;
   (C) means for providing a fixed second quantization standard; and
   (D) quantization means receiving said scanned image signal to provide quantized data on said image, said quantization means providing first quantized data by quantizing the image signal with said first quantization standard provided by said first quantization standard provision means and providing second quantized data by quantizing the image signal with said second quantization standard provided by said second quantization standard provision means.

2. The system according to claim 1, further comprising:
   detection means coupled to said image scanning means for detecting said specific level of said scanned image signal;
   said first quantization standard provision means being coupled to said detection means and arranged to provide said first quantization standard on the basis of the detected specific level of the scanned image signal detected by the detection means.

3. The system according to claim 2, wherein said quantization means includes:
   a first quantization circuit receiving said scanned image signal to produce said first quantized data, said first quantization circuit being coupled to said first quantization standard provision means and producing the first quantized data by comparing the image signal with said first quantization standard provided by the first quantization standard provision means; and
   a second quantization circuit receiving said scanned image signal to produce said second quantized data, said second quantization circuit being coupled to said second quantization standard provision means and producing the second quantized data by comparing the image signal with said second quantization standard provided by the second quantization standard provision means.

4. The system according to claim 2, further comprising:
   means for setting a range of reference having a minimum and a maximum reference level;
   discrimination means coupled to said detection means and said reference range setting means for discriminating whether or not the specific level of the scanned image signal detected by the detection means deviates from the reference range set by the reference range setting means, said discrimination means producing a first indication when the specific level detected by the detection means is within said reference range and producing a second indication when the specific level deviates from said reference range; and
   selection means responsive to said first and second indications produced by said discrimination means for selecting one of said first and second quantized data provided by said quantization means, said selection means being coupled to said quantization means and said discrimination means to select the first quantized data in response to the first indication and select the second quantized data in response to the second indication.

5. The system according to any one of claims 2 or 3, wherein said detection means is arranged to detect a peak level of said scanned image signal as said specific level.

6. The system according to claim 5, wherein said first quantization standard provision means is arranged to provide as said first quantization standard to said quantization means a signal level obtained by multiplying the peak level of the scanned image signal detected by said detection means by a number smaller than 1.

7. The system according to claim 6, wherein said number is any one in the range of 0.6 to 0.8.

8. The system according to claim 4, wherein said second quantization standard provision means is included in said reference range setting means and provides, as said fixed second quantization standard to said quantization means, a predetermined reference level within said reference range set by said reference range setting means.

9. The system according to claim 8, wherein said second quantization standard provision means is arranged to provide, as said fixed second quantization standard, a reference level substantially represented by (minimum level + maximum level)/2 for said minimum and maximum reference levels of said reference range set by said reference range setting means.

10. The system according to claim 8, wherein said second quantization standard provision means is arranged to provide, as said fixed second quantization standard, a reference level substantially represented by $$\sqrt{\text{minimum level} \times \text{maximum level}}$$

for said minimum and maximum reference levels of said reference range set by said reference range setting means.

11. The system according to claim 4, wherein said discrimination means produces a first sub-indication as said second indication when the specific level of the scanned image signal detected by said detection means is below the minimum reference level of the reference range set by said reference range setting means and produces a second sub-indication as said second indication when the specific level is over the maximum reference level of the reference range; and said image scanning means is a signal integration type image scanning means which provides, as said scanned image signal, an image signal integrated within an integration time; and wherein the system further comprises:
   integration time control means responsive to said first and second sub-indications produced by said discrimination means for controlling the integration time of the image signal in said image scanning means, said control means being coupled to the image scanning means and said discrimination means to extend the integration time in response to the first sub-indication and to shorten the integration time in response to the second sub-indication.

12. The system according to claim 2, further comprising:

discrimination means coupled to said detection means for discriminating whether or not the specific level of the scanned image signal detected by the detection means is within a predetermined range of levels, said discrimination means producing a first indication when the specific level detected by the detection means is within said predetermined range and producing a second indication when the specific level deviates from said predetermined range;

control means responsive to said second indication produced by said discrimination means for adjusting the levels of said scanned image signal so that said specific level of the scanned image signal is within said predetermined range, said control means being coupled to said image scanning means and said discrimination means; and selection means responsive to said first and second indications produced by said discrimination means for selecting one of said first and second quantized image data provided by said quantization means, said selection means being coupled to said quantization means and said discrimination means to select the first quantized data in response to the first indication and to select the second quantized data in response to the second indication.

13. An apparatus for detecting the range of an object, comprising:

(A) image scanning means adapted to receive first and second detection field images containing the image of said object along different sight lines to produce an electrical signal on each image element of said first and second detection field images;

(B) detection means for detecting a specific level of the image element signals on said first detection field image;

(C) first quantization standard provision means for providing a first quantization standard on the basis of the specific level detected by said detection means;

(D) second quantization standard provision means for providing a fixed second quantization standard;

(E) quantization means for providing quantized data on the image elements of said detection field images, said quantization means providing first quantized data by quantizing the image element signals with said first quantization standard provided by said first quantization standard provision means and providing second quantized data by quantizing the image element signals with said second quantization standard provided by said second quantization standard provision means;

(F) discrimination means for discriminating whether or not the specific level detected by said detection means is within a predetermined range of levels, said discrimination means producing a first indication when the specific level is within said predetermined range and producing a second indication when the specific level deviates from said predetermined range;

(G) selection means responsive to said first and second indications produced by said discrimination means for selecting one of said first and second quantized data provided by said quantization means, said selection means selecting said first quantized data in response to said first indication and selecting said second quantized data in response to said second indication;

(H) storing means for storing the selected quantized data selected by said selection means, said storing means storing at least the quantized data on M successive image elements of said first detection field image and N, being greater than M, successive image elements of the second detection field image; and (I) location detection means for detecting, on the basis of the stored quantized data stored in said storing means, a location, within said second detection field image, of one set of M successive image elements which is most similar to the M successive image elements of said first detection field image, said location being indicative of the range of said object.

14. The apparatus according to claim 13, wherein said quantization means includes:

a first quantization circuit for producing the first quantized data, said first quantization circuit being coupled to said image scanning means and said first quantization standard provision means and producing the first quantized data by comparing said image element signals with said first quantization standard; and a second quantization circuit for producing the second quantized data, said second quantization circuit being coupled to said image scanning means and said second quantization standard provision means and producing the second quantized data by comparing said image element signal with said second quantization standard;

and wherein said selection means is coupled to said first and second quantization circuits and selects the output data of the first quantization circuit in response to said first indication produced by said discrimination means and selects the output data of the second quantization circuit in response to said second indication.

15. The apparatus according to claim 13 or 14, further comprising:

control means responsive to said second indication produced by said discrimination means for adjusting the levels of the image element signals on the first and second detection field images so that said specific level of the image element signals on said first detection field image is within said predetermined range of levels, said control means being coupled to said image scanning means and said discrimination means.

16. The apparatus according to claim 15, further comprising:

means for setting said predetermined range of levels with a lower and an upper limit level;

wherein said discrimination means is coupled to said setting means and produces a first sub-indication as said second indication when said specific level detected by said detection means is below said lower limit level and produces a second sub-indication as the second indication when the specific level is over the upper limit level; said selection means selects said second quantized data in response to both of said first and second sub-indications; and said control means controls said image scanning means to increase the levels of the image element signals in response to said first sub-indication and controls said image scanning means to decrease the levels of the image element signals in response to said second sub-indication.

17. The apparatus according to claim 16, wherein said image scanning means is a signal integration type image scanning means which provides, as said image element signals, signals integrated within an integration time; and said control means is an integration time control means for controlling the integration time of the signals in said image scanning means to adjust the levels of the image element signals and extends the integration time in response to said first sub-indication and shortens the integration time in response to said second sub-indication.

18. The apparatus according to claim 16, wherein said second quantization standard provision means is included in said setting means and provides, as said second quantization standard to said quantization means, a predetermined level within said predetermined range of levels said by said setting means.

19. The apparatus according to claim 18, wherein said second quantization standard provision means is arranged to provide, as said second quantization standard, a predetermined level substantially represented by (lower limit level + upper limit level)/2 for the lower and upper limit levels of said predetermined range set by said setting means.

20. The apparatus according to claim 18, wherein said second quantization standard provision means is arranged to provide, as said second quantization standard, a predetermined level substantially represented by $$\sqrt{\text{lower limit level} \times \text{upper limit level}}$$

for said lower and upper limit levels of said predetermined range set by said setting means.

21. The apparatus according to claim 13 or 16, wherein said detection means is arranged to detect a peak level of the image element signals on said first detection field image as said specific level.

22. The apparatus according to claim 21, wherein said first quantization standard provision means is arranged to provide, as said first quantization standard to said quantization means, a signal level obtained by multiplying the peak level detected by said detection means by a number smaller than 1.

23. The apparatus according to claim 22, wherein said number is any number in the range of 0.6 to 0.8.

24. An image comparison system for detecting a relative positional difference between two images each having an associated image portion, comprising:
(A) image scanning means for scanning the two images and for producing scanned image signals on the images;
(B) detection means for detecting a specific level of the scanned image signal on one of the two images;
(C) quantization means for quantizing the scanned image signals produced by said image scanning means and for providing quantized data on the images, said quantization means providing first quantized data by quantizing the scanned signals with a first quantization standard determined on the basis of said specific level detected by said detection means and providing second quantized data by quantizing the scanned signals with a fixed second quantization standard;
(D) discrimination means for discriminating whether or not the specific level detected by said detection means is within a predetermined range of levels, said discrimination means producing a first indication when the specific level is within said predetermined range and producing a second indication when the specific level deviates from said predetermined range;
(E) selection means responsive to said first and second indications produced by said discrimination means for selecting one of said first and second quantized data provided by said quantization means, said selection means selecting said first quantized data in response to said first indication and selecting said second quantized data in response to said second indication; and
(F) data processing means for detecting, on the basis of the selected quantized data selected by said selection means, the relative positional difference between said associated image portions of the two images.

25. The system according to claim 24, wherein said quantization means includes:
means coupled to said detection means for determining said first quantization standard on the basis of said specific level;
means for setting, as said fixed second quantization standard, a predetermined reference level within said predetermined range of levels;
means for comparing the scanned signals with the first quantization standard determined by said first quantization standard determining means and for providing said first quantized data;
means for comparing the scanned signals with the second quantization standard set by said second quantization standard setting means and for providing said second quantized data.

26. The system according to claim 24 or 25, further comprising:
control means responsive to said second indication produced by said discrimination means for adjusting the levels of the scanned signals so that said specific level is within said predetermined range of levels, said control means being coupled to said image scanning means and said discrimination means.

27. The system according to claim 26, further comprising:
means for setting said predetermined range of levels with a lower and an upper limit level;
wherein said discrimination means is coupled to said range setting means and produces a first sub-indication as said second indication when said specific level detected by said detection means is below said lower limit level and produces a second sub-indication as the second indication when the specific level is over the upper limit level; said selection means selects said second quantized data in response to both of said first and second sub-indications; and said control means controls said image scanning means to increase the levels of the scanned signals in response to said first sub-indication and controls said image scanning means to decrease the levels of the scanned signals in response to said second sub-indication.

28. The system according to claim 27, wherein said image scanning means is a signal integration type image scanning means which provides, as said scanned signals, signals integrated within an integration time; and said control means is an integration time control means for controlling the integration time of the signals in said image scanning means to adjust the levels of the scanned signals and extends the integration time in response to said first sub-indication and shortens the integration time in response to said second sub-indication.

* * * * *

UNITED STATES PATENT AND TRADEMARK OFFICE
CERTIFICATE OF CORRECTION

PATENT NO. : 4,283,137
DATED : August 11, 1981
INVENTOR(S) : TOKUICHI TSUNEKAWA, ET AL.

It is certified that error appears in the above—identified patent and that said Letters Patent is hereby corrected as shown below:

Column 13, line 14, "$V_{BE_4}$" should be --$V_{BE_3}$--.

Column 18, line 48, "12" should be --21--.

Column 27, line 68, " > " second occurrence should be -- < --.

Signed and Sealed this

Twelfth Day of January 1982

[SEAL]

Attest:

Attesting Officer

GERALD J. MOSSINGHOFF

Commissioner of Patents and Trademarks